United States Patent
Zhang

(10) Patent No.: US 12,120,596 B2
(45) Date of Patent: Oct. 15, 2024

(54) METHOD AND DEVICE FOR CONTROLLING CONNECTION TO NETWORK

(71) Applicant: Huawei Technologies Co., Ltd., Shenzhen (CN)

(72) Inventor: Yunxiang Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 558 days.

(21) Appl. No.: 17/425,595

(22) PCT Filed: Dec. 11, 2019

(86) PCT No.: PCT/CN2019/124431
§ 371 (c)(1),
(2) Date: Jul. 23, 2021

(87) PCT Pub. No.: WO2020/151385
PCT Pub. Date: Jul. 30, 2020

(65) Prior Publication Data
US 2022/0086735 A1   Mar. 17, 2022

(30) Foreign Application Priority Data
Jan. 25, 2019 (CN) .......................... 201910071180.5

(51) Int. Cl.
*H04W 48/08* (2009.01)
*H04W 12/06* (2021.01)
(Continued)

(52) U.S. Cl.
CPC ......... *H04W 48/08* (2013.01); *H04W 12/068* (2021.01); *H04W 48/16* (2013.01); *H04W 76/10* (2018.02); *H04W 84/12* (2013.01)

(58) Field of Classification Search
CPC ... H04W 48/08; H04W 12/068; H04W 48/16; H04W 76/10; H04W 84/12; H04W 12/069; H04W 12/73
See application file for complete search history.

(56) References Cited

U.S. PATENT DOCUMENTS 10,057,813 B1    8/2018 Likar et al.
2012/0317619 A1  12/2012 Dattagupta et al.
(Continued)

FOREIGN PATENT DOCUMENTS

CN    103415030 A    11/2013
CN    104335554 A    2/2015
(Continued)

*Primary Examiner* — John D Blanton
(74) *Attorney, Agent, or Firm* — Conley Rose, P.C.

(57) ABSTRACT

A method for controlling a network connection includes receiving a reset operation of a user, determining, in response to the reset operation, whether a smart household device is disconnected from a network. Creating a WI-FI hotspot based on a first WI-FI name and a first WI-FI password in response to the smart household device being disconnected from the network, where the smart household device has accessed the network based on the first WI-FI name and the first WI-FI password using a wireless access point (AP) before being disconnected from the network. Obtaining a second WI-FI name or a second WI-FI password, and sending the second WI-FI name or the second WI-FI password to the smart household device based on the WI-FI hotspot to enable the smart household device to re-access the network based on the second WI-FI name or the second WI-FI password using the wireless AP.

20 Claims, 14 Drawing Sheets

(51) Int. Cl.
*H04W 48/16* (2009.01)
*H04W 76/10* (2018.01)
*H04W 84/12* (2009.01)

(56) References Cited

U.S. PATENT DOCUMENTS

| | | |
|---|---|---|
| 2015/0071052 A1 | 3/2015 | Hershberg et al. |
| 2016/0249286 A1 | 8/2016 | Chen |
| 2017/0171698 A1* | 6/2017 | Lan .......................... H04W 4/80 |
| 2018/0368058 A1* | 12/2018 | Huang ................. H04W 48/16 |
| 2022/0308195 A1* | 9/2022 | Zeng ..................... G01S 13/003 |

FOREIGN PATENT DOCUMENTS

| | | |
|---|---|---|
| CN | 105262652 A | 1/2016 |
| CN | 105323762 A | 2/2016 |
| CN | 105898830 A | 8/2016 |
| CN | 106936676 A | 7/2017 |
| CN | 107171837 A | 9/2017 |
| CN | 107205258 A | 9/2017 |
| CN | 107613471 A | 1/2018 |
| CN | 108449770 A | 8/2018 |
| EP | 2955949 A1 | 12/2015 |

\* cited by examiner

METHOD AND DEVICE FOR CONTROLLING CONNECTION TO NETWORK

CROSS-REFERENCE TO RELATED APPLICATIONS

This is a U.S. National Stage of International Patent Application No. PCT/CN2019/124431 filed on Dec. 11, 2019, which claims priority to Chinese Patent Application No. 201910071180.5 filed on Jan. 25, 2019, both of which are hereby incorporated by reference in their entireties.

TECHNICAL FIELD

This application relates to the field of internet of things technologies, and in particular, to a method for controlling a smart household device to connect to a network and a device.

BACKGROUND

Development of the internet of things (internet of things, IoT) provides great convenience for people's lives. Currently, a user may perform an operation on an application (application, APP) installed on a terminal such as a mobile phone or a tablet computer, to implement remote control on a smart household device. An intelligent electric lamp is used as an example. The user may remotely control turning on or off, brightness adjustment, or the like of the intelligent electric lamp by performing an operation on the smart household APP installed on the mobile phone.

Specifically, after connecting to a network, the terminal may send an instruction for controlling a smart household device to a smart household cloud server in response to the operation performed by the user on the smart household APP. After receiving the instruction, the smart household cloud server sends the instruction to a corresponding smart household device that registers with the smart household cloud server and that is bound to the terminal. The smart household device registers with the smart household cloud server by accessing the network. For example, as shown in FIG. 1, the smart household device accesses the network by using a router, registers with the smart household cloud server, then receives, by using the router, the instruction sent by the smart household cloud server, and the like.

The smart household device needs to perform network configuration to connect to the router, to access the network. Currently, network configuration modes of the smart household device generally include a soft access point (soft access point, soft AP) mode and a smart config (smart config) mode. FIG. 2 is a schematic diagram of a network configuration procedure based on the soft AP mode. The procedure specifically includes the following steps:

Step 201: After a user starts a smart household device for the first time, the smart household device automatically enters the AP mode, and may be used as a soft AP. A terminal enables a Wi-Fi function and is in a station mode, and may be connected to the soft AP provided by the smart household device, so that a local area network is formed between the terminal and the smart household device, to implement data exchange between the terminal and the smart household device.

Step 202: The terminal establishes a connection to the smart household device based on the soft AP provided by the smart household device, and obtains a Wi-Fi name and a Wi-Fi password that are entered by the user in a user interface of a smart household APP.

Step 203: The terminal sends the obtained Wi-Fi name and Wi-Fi password to the smart household device by using the local area network constructed based on the soft AP provided by the smart household device.

Step 204: After receiving the Wi-Fi name and the Wi-Fi password, the smart household device switches from the soft AP mode to the station mode, and performs network search in a nearby area range based on the received Wi-Fi name and Wi-Fi password, to connect to a router for which the same Wi-Fi name and Wi-Fi password are configured in the nearby area range, to access a network, so as to register with a smart household cloud server.

Step 205: After the smart household device switches to the station mode, the terminal is automatically disconnected from the smart household device, and then the user may manually switch the terminal to the same router as the smart household device. Therefore, the smart household cloud server implements binding of the terminal to the smart household device, and the network configuration procedure ends until now. The terminal can implement control on the smart household device by connecting to a network such as 2G, 3G, 4G, 5G, or Wi-Fi.

FIG. 3 is a schematic diagram of a network configuration procedure based on the smart config mode. The procedure specifically includes the following steps:

Step 301: After a user starts a smart household device for the first time, the smart household device automatically enters the smart config mode, and receives a message that is sent by a terminal after the terminal accesses a network and that carries an encrypted Wi-Fi name and Wi-Fi password. The terminal accesses the network by accessing a router for which the sent Wi-Fi name and Wi-Fi password are configured. The terminal may send, to the smart household device by using the router, a broadcast packet group or a multicast packet group that carries the encrypted Wi-Fi name and Wi-Fi password, or may directly send a probe request packet group to the smart household device.

Step 302: After receiving the message, the smart household device may decrypt the message to obtain the Wi-Fi name and the Wi-Fi password, switch from the smart config mode to a station mode, and perform network search in a nearby area range based on the Wi-Fi name and the Wi-Fi password obtained through decryption, to connect to a router for which the same Wi-Fi name and Wi-Fi password are configured in the nearby area range, to access a network, so as to register with a smart household cloud server.

In the network configuration procedure shown in FIG. 3, after step 302 is performed, the smart household device and the terminal are connected to the same router. Therefore, the smart household cloud server implements binding of the terminal to the smart household device, and the network configuration procedure ends until now.

However, after the smart household device accesses the network, once the Wi-Fi password or the Wi-Fi name on the router side changes, the smart household device is prone to be disconnected from the network, and consequently, the terminal cannot control the smart household device. In the current technology, after the smart household device is disconnected from the network, a reset operation needs to be manually performed on the smart household device, so that the smart household device can re-enter a network configuration mode (for example, the soft AP mode or the smart config mode), and then the network configuration procedure shown in FIG. 2 or FIG. 3 is performed, so that the smart household device can re-access the network and control of the terminal on the smart household device is resumed. The operations of re-accessing the network after the smart household device is disconnected from the network are relatively cumbersome, and user experience is relatively poor.

SUMMARY

Embodiments of this application provide a method for controlling a smart household device to connect to a network and a device, to simplify a manner of re-accessing a network after a smart household is disconnected from the network, so that user experience is improved.

According to a first aspect, an embodiment of this application provides a method for controlling a smart household device to connect to a network, where the method is applied to a terminal, and the method includes: receiving a reset operation of a user: in response to the reset operation, determining whether a smart household device is disconnected from a network; if the smart household device is disconnected from the network, creating a Wi-Fi hotspot based on a first wireless fidelity Wi-Fi name and a first Wi-Fi password, where before being disconnected from the network, the smart household device accesses the network based on the first Wi-Fi name and the first Wi-Fi password through a wireless access point AP; obtaining a second Wi-Fi name and/or a second Wi-Fi password; and sending the second Wi-Fi name and/or the second Wi-Fi password to the smart household device based on the Wi-Fi hotspot, so that the smart household device re-accesses the network based on the second Wi-Fi name and/or the second Wi-Fi password by using an AP.

In this embodiment of this application, through the reset operation of the user, the terminal can automatically create the Wi-Fi hotspot when the smart household device is disconnected from the network, so that the smart household device is connected to the terminal by using the first Wi-Fi password and the first Wi-Fi name before network disconnection, and then the terminal sends the second Wi-Fi name and/or the second Wi-Fi password to the smart household device, so that the smart household device can re-access the network based on the second Wi-Fi name and/or the second Wi-Fi password. In comparison with the current technology, the user does not need to perform a manual reset operation on the smart household device for re-performing a network configuration procedure, which simplifies a manner in which the smart household device re-accesses the network after being disconnected from the network, so that user experience is improved.

In a possible design, the Wi-Fi hotspot is automatically disabled if a response that indicates that the second Wi-Fi name and/or the second Wi-Fi password are or is received and that is sent by the smart household device is received after the second Wi-Fi name and/or the second Wi-Fi password are or is sent to the smart household device; or the Wi-Fi hotspot is automatically disabled after preset duration is reached after the second Wi-Fi name and/or the second Wi-Fi password are or is sent to the smart household device. Therefore, power consumption of the terminal is reduced.

In a possible design, when a distance between the terminal and the smart household device does not fall beyond a preset range, the Wi-Fi hotspot is created based on the first Wi-Fi name and the first Wi-Fi password. Therefore, a possibility of establishing a connection to the terminal by the smart household device is improved.

In a possible design, the method further includes: receiving a reset stopping operation of the user; and stopping, in response to the reset stopping operation, performing the method for controlling a smart household device to connect to a network. Through the foregoing technical solution, the user can enable, based on a requirement of the user, the terminal to stop performing the method for controlling a smart household device to connect to a network.

In a possible design, in this embodiment of this application, it may be determined, in the following manner, whether the smart household device is disconnected from the network: determining whether an operation of changing the first Wi-Fi name to the second Wi-Fi name and/or changing the first Wi-Fi password to the second Wi-Fi password by the user on an application is detected. Therefore, the implementation is simplified.

In a possible design, the application is a system application or an application for controlling a smart household device.

According to a second aspect, an embodiment of this application provides a method for controlling a smart household device to connect to a network, where the method includes: A smart household device accesses a network based on a first wireless fidelity Wi-Fi name and a first Wi-Fi password through a wireless access point AP. After being disconnected from the network, the smart household device accesses a Wi-Fi hotspot based on the first Wi-Fi name and the first Wi-Fi password, to establish a connection to a terminal. The Wi-Fi hotspot is created by the terminal based on the first Wi-Fi name and the first Wi-Fi password. Then the smart household device receives, based on the Wi-Fi hotspot, a second Wi-Fi name and/or a second Wi-Fi password that are or is sent by the terminal. Finally, the smart household device re-accesses the network based on the second Wi-Fi name and/or the second Wi-Fi password by using an AP.

In this embodiment of this application, after being disconnected from the network, the smart household device can establish a connection to the terminal by using the Wi-Fi hotspot created by the terminal, to receive the second Wi-Fi name and/or the second Wi-Fi password that are or is sent by the terminal, so that the smart household device can re-access the network based on the second Wi-Fi name and/or the second Wi-Fi password. In comparison with the current technology, the user does not need to perform a manual reset operation on the smart household device for re-performing a network configuration procedure, which simplifies a manner in which the smart household device re-accesses the network after being disconnected from the network, so that user experience is improved.

In a possible design, after receiving the second Wi-Fi name and/or the second Wi-Fi password that are or is sent by the terminal, the smart household device sends a response indicating that the second Wi-Fi name and/or the second Wi-Fi password are or is received to the terminal. Therefore, the terminal determines that the smart household device receives the second Wi-Fi name and/or the second Wi-Fi password.

According to a third aspect, an embodiment of this application provides a terminal, where the terminal includes a processor and a memory: the memory stores program instructions; and the processor is configured to run the program instructions stored in the memory, so that the terminal performs the following operations: receiving a reset operation of a user; in response to the reset operation, determining whether a smart household device is disconnected from a network; if the smart household device is disconnected from the network, creating a Wi-Fi hotspot based on a first wireless fidelity Wi-Fi name and a first Wi-Fi password, where before being disconnected from the network, the smart household device accesses the network based on the first Wi-Fi name and the first Wi-Fi password through a wireless access point AP; obtaining a second Wi-Fi name and/or a second Wi-Fi password; and then sending the second Wi-Fi name and/or the second Wi-Fi password to the smart household device based on the Wi-Fi hotspot, so that the smart household device re-accesses the network based on the second Wi-Fi name and/or the second Wi-Fi password by using an AP.

In a possible design, the program instructions further include: an instruction used to automatically disable the Wi-Fi hotspot if a response that indicates that the second Wi-Fi name and/or the second Wi-Fi password are or is received and that is sent by the smart household device is received after the second Wi-Fi name and/or the second Wi-Fi password are or is sent to the smart household device; or an instruction used to automatically disable the Wi-Fi hotspot after preset duration is reached after the second Wi-Fi name and/or the second Wi-Fi password are or is sent to the smart household device.

In a possible design, when a distance between the terminal and the smart household device does not fall beyond a preset range, the Wi-Fi hotspot is created based on the first Wi-Fi name and the first Wi-Fi password.

In a possible design, the program instructions further include: an instruction used to receive a reset stopping operation of the user; and an instruction used to stop, in response to the reset stopping operation, performing a method for controlling a smart household device to connect to a network.

In a possible design, it is determined whether an operation of changing the first Wi-Fi name to the second Wi-Fi name and/or changing the first Wi-Fi password to the second Wi-Fi password by the user on an application is detected.

In a possible design, the application is a system application or an application for controlling a smart household device.

According to a fourth aspect, an embodiment of this application provides a smart household device, where the smart household device includes a processor and a memory; the memory stores program instructions; and the processor is configured to run the program instructions stored in the memory, so that the smart household device performs the following operations: accessing a network based on a first wireless fidelity Wi-Fi name and a first Wi-Fi password through a wireless access point AP; after the smart household device is disconnected from the network, accessing a Wi-Fi hotspot based on the first Wi-Fi name and the first Wi-Fi password, to establish a connection to a terminal, where the Wi-Fi hotspot is created by the terminal based on the first Wi-Fi name and the first Wi-Fi password; then receiving, based on the Wi-Fi hotspot, a second Wi-Fi name and/or a second Wi-Fi password that are or is sent by the terminal: and finally, re-accessing the network based on the second Wi-Fi name and/or the second Wi-Fi password by using an AP.

In a possible design, the program instructions further include an instruction used to send a response indicating that the second Wi-Fi name and/or the second Wi-Fi password are or is received to the terminal after the second Wi-Fi name and/or the second Wi-Fi password that are or is sent by the terminal are or is received.

According to a fifth aspect, an embodiment of this application provides an electronic device, including an apparatus for performing the method according to any one of the first aspect and the different possible designs of the first aspect.

According to a sixth aspect, an embodiment of this application provides an electronic device, including an apparatus for performing the method according to any one of the second aspect and the different possible designs of the second aspect.

According to a seventh aspect, an embodiment of this application provides a chip, where the chip is coupled to a memory in an electronic device, so that when running, the chip invokes program instructions stored in the memory, and the electronic device performs the method according to any one of the first aspect and the different possible designs of the first aspect in the embodiments of this application, or the method according to any one of the second aspect and the different possible designs of the second aspect in the embodiments of this application.

According to an eighth aspect, an embodiment of this application provides a computer storage medium, where the computer storage medium stores program instructions, and when the program instructions run on an electronic device, the electronic device performs the method according to any one of the first aspect and the different possible designs of the first aspect in the embodiments of this application, or the method according to any one of the second aspect and the different possible designs of the second aspect in the embodiments of this application.

According to a ninth aspect, an embodiment of this application provides a computer program product, where when the computer program product runs on an electronic device, the electronic device performs the method according to any one of the first aspect and the different possible designs of the first aspect in the embodiments of this application, or the method according to any one of the second aspect and the different possible designs of the second aspect in the embodiments of this application.

According to a tenth aspect, an embodiment of this application further provides a communications system, including the terminal according to any one of the third aspect and the possible designs of the third aspect in the embodiments of this application and the smart household device according to any one of the fourth aspect and the possible designs of the fourth aspect in the embodiments of this application.

In addition, for technical effects brought by any possible design manner of the third to the tenth aspects, refer to technical effects brought by different design manners of the method parts in the embodiments of this application. Details are not described herein again.

DESCRIPTION OF EMBODIMENTS

In the embodiments of this application, "at least one" means one or more, and "a plurality of" means two or more. "and/or" describes the association relationship between associated objects, indicating that there may be three relationships. For example, A and/or B may represent the following three relationships: Only A exists, both A and B exist, and only B exists, where A and B may be singular or plural. The character "/" generally indicates an "or" relationship between the associated objects. "at least one of the following" or a similar expression thereof indicates any combination of the items, including any combination of one or more of the items. For example, at least one of a, b, and c may indicate a, b, c, a and b, a and c, b and c, or a, b, and c, where a, b, and c may be singular or plural.

It should be understood that the embodiments of this application may be applied to a terminal. In some embodiments of this application, the terminal may be a portable mobile terminal such as a mobile phone, a tablet computer, a wearable device (for example, a smart watch) that has a wireless communication function, or an in-vehicle device. Example embodiments of the portable mobile terminal include but are not limited to IOS®, Android®, Microsoft®, or another operating system. The terminal in the embodiments of this application may be alternatively a laptop (Laptop), for example, a laptop with a touch-sensitive surface (for example, a touch panel). It should be further understood that in some other embodiments of this application, the terminal may be alternatively a desktop computer, for example, a desktop computer with a touch-sensitive surface (for example, a touch panel).

Figure 4:
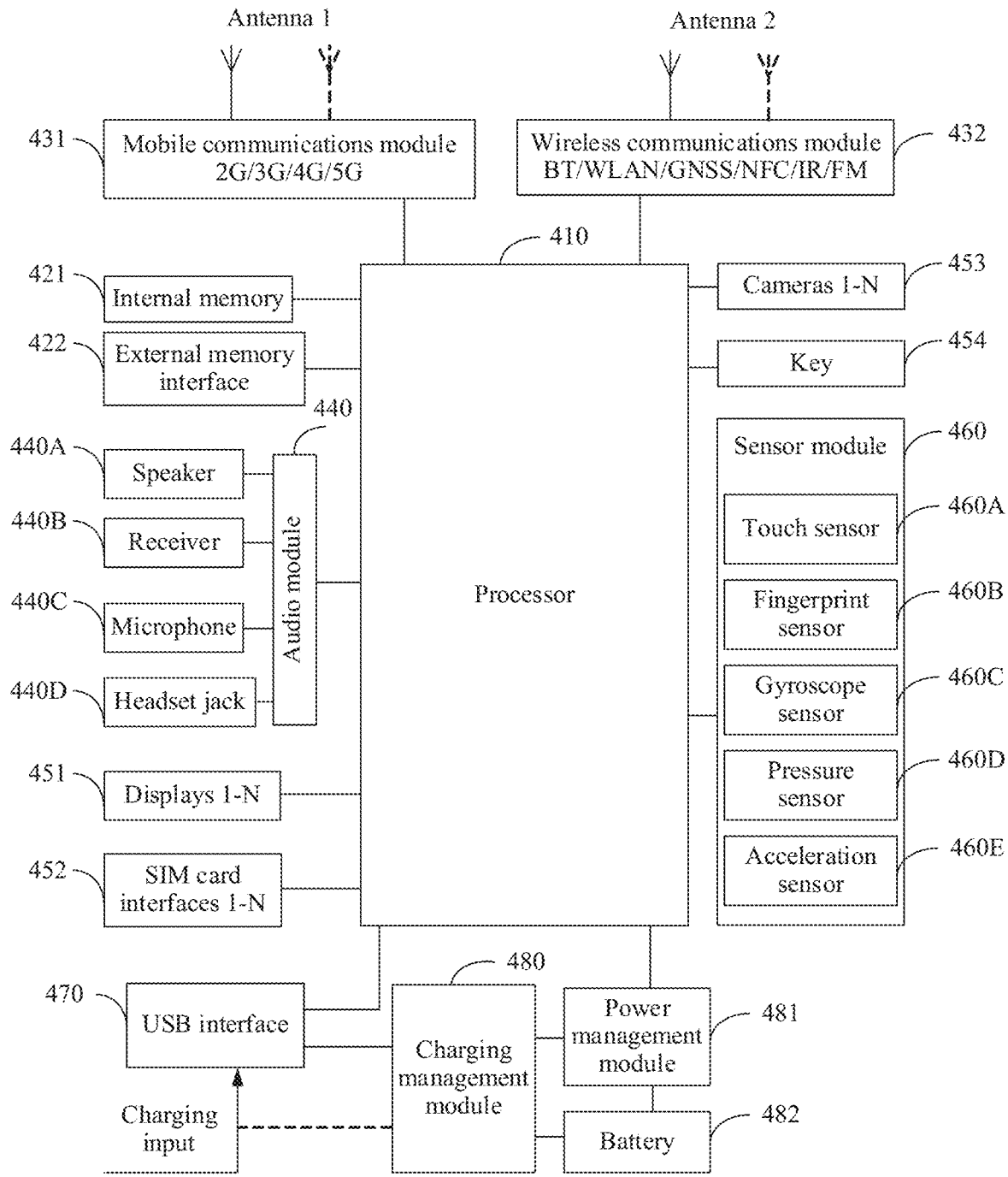
FIG. 4 is a schematic diagram of a hardware structure of a terminal according to an embodiment of this application.

For example, FIG. 4 is a schematic diagram of a hardware structure of a terminal according to an embodiment of this application. Specifically, as shown in the figure, the terminal includes a processor 410, an internal memory 421, an external memory interface 422, an antenna 1, a mobile communications module 431, an antenna 2, a wireless communications module 432, an audio module 440, a speaker 440A, a receiver 440B, a microphone 440C, a headset jack 440D, a display 451, a subscriber identity module (subscriber identification module, SIM) card interface 452, a camera 453, a key 454, a sensor module 460, a universal serial bus (universal serial bus, USB) interface 470, a charging management module 480, a power management module 481, and a battery 482. In some other embodiments, the terminal may further include a motor, an indicator, and the like.

The processor 410 may include one or more processing units. For example, the processor 410 may include an application processor (application processor, AP), a modem, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

In some embodiments, a memory may be further disposed in the processor 410, and is configured to store an instruction and data. For example, the memory in the processor 410 may be a cache. The memory may be configured to store an instruction or data that is just used or used cyclically by the processor 410. If the processor 410 needs to use the instruction or the data again, the processor 410 may directly invoke the instruction or the data from the memory. Therefore, repeated access is avoided, and a waiting time of the processor 410 is reduced, thereby improving system efficiency.

The internal memory 421 may be configured to store computer executable program code. The executable program code includes instructions. By running the instructions stored in the internal memory 421, the processor 410 performs various function applications and data processing of the terminal. The internal memory 421 may include a program storage area and a data storage area. The program storage area may store an operating system, an application program required by at least one function (for example, a voice playing function and an image playing function), and the like. The data storage area may store data (for example, audio data or a phone book) created in a process of using the terminal, and the like. In addition, the internal memory 421 may include a high-speed random access memory, or may include a non-volatile memory such as at least one magnetic disk storage component, a flash memory component, or a universal flash storage (universal flash storage, UFS).

The external memory interface 422 may be configured to connect to an external storage card (for example, a micro SD card), to expand a storage capability of the terminal. The external storage card communicates with the processor 410 through the external storage interface 422, to implement a data storage function. For example, a file such as music or a video is stored in the external storage card.

The antenna 1 and the antenna 2 are configured to transmit and receive electromagnetic wave signals. Each antenna in the terminal may be configured to cover one or more communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 431 may provide a solution that is applied to the terminal and that includes wireless communication such as 2G/3G/4G/5G. The mobile communications module 431 may include at least one filter, switch, power amplifier, low noise amplifier (low noise amplifier, LNA), and the like. The mobile communications module 431 may receive an electromagnetic wave signal by using the antenna 1, perform processing such as filtering and amplification on the received electromagnetic wave signal, and send an electromagnetic wave signal obtained after processing to the modem for demodulation. The mobile communications module 431 may further amplify a signal obtained after modulation by the modem, and convert the signal into an electromagnetic wave signal and radiate the electromagnetic wave signal by using the antenna 1. In some embodiments, at least some of function modules of the mobile communications module 431 may be disposed in the processor 410. In some embodiments, at least some of the function modules of the mobile communications module 431 may be disposed in a same component as at least some of modules of the processor 410.

The modem may include a modulator and a demodulator. The modulator is configured to modulate a to-be-sent low-frequency baseband signal into an intermediate-high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 440A, the receiver 440B, and the like), or displays an image or a video by using the display 451. In some embodiments, the modem may be a standalone component. In some other embodiments, the modem may be independent of the processor 410 and disposed in a same component as the mobile communications module 431 or another function module.

The wireless communications module 432 may provide a solution that is applied to the terminal and that includes wireless communication such as a WLAN (for example, a network), Bluetooth (bluetooth, BT), a global navigation satellite system (global navigation satellite system. GNSS), frequency modulation (frequency modulation, FM), a near field communication (near field communication, NFC) technology, and an infrared (infrared, IR) technology. The wireless communications module 432 may be one or more components integrated with at least one communications processing module. The wireless communications module 432 receives an electromagnetic wave signal by using the antenna 2, performs frequency modulation and filtering processing on the electromagnetic wave signal, and sends a signal obtained after processing to the processor 410. The wireless communications module 432 may further receive a to-be-sent signal from the processor 410, perform frequency modulation and amplification on the to-be-sent signal, and convert the signal into an electromagnetic wave signal and radiate the electromagnetic wave signal by using the antenna 2.

In some embodiments, the antenna 1 of the terminal is coupled to the mobile communications module 431, and the antenna 2 is coupled to the wireless communications module 432, so that the terminal can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or a satellite based augmentation system (satellite based augmentation systems. SBAS).

The terminal may implement an audio function such as music play or recording by using the audio module 440, the speaker 440A, the receiver 440B, the microphone 440C, the headset jack 440D, the application processor, and the like.

The audio module 440 may be configured to convert digital audio information into analog audio signal output, and is also configured to convert analog audio input into a digital audio signal. The audio module 440 may be further configured to encode and decode an audio signal. In some embodiments, the audio module 440 may be disposed in the processor 410, or some function modules of the audio module 440 may be disposed in the processor 410.

The speaker 440A, also referred to as a "horn", is configured to convert an audio electrical signal into a sound signal. The terminal may listen to music or answer a hands-free call by using the speaker 440A.

The receiver 440B, also referred to as an "earpiece", is configured to convert an audio electrical signal into a sound signal. When answering a call by using the terminal, a user may listen to, by placing the receiver 440B close to an ear, a voice received by using the mobile communications module 431 or the wireless communications module 432.

The microphone 440C is configured to convert a sound signal into an electrical signal. When using the terminal to make a call or send a voice, the user may sound by making a mouth close to the microphone 440C. The microphone 440C may be configured to collect the sound of the user, and then convert the sound of the user into an electrical signal. At least one microphone 140C may be disposed in the terminal. In some embodiments, two microphones 440C may be disposed in the terminal, to implement a denoising function in addition to collecting a sound signal. In some other embodiments, three, four, or more microphones 440C may be disposed in the terminal, to collect a sound signal, perform denoising, identify a sound source, implement a directional recording function, and the like.

The headset jack 440D is configured to connect to a wired headset. The headset jack 440D may be the USB interface 430, or may be a 3.5 mm open mobile electronic device platform (open mobile terminal platform, OMTP) standard interface, a cellular telecommunications industry association of the USA (cellular telecommunications industry association of the USA, CTIA) standard interface, or the like.

The terminal may implement a display function by using the GPU, the display 451, the application processor, and the like. The GPU is a microprocessor for image processing, and is connected to the display 451 and the application processor. The GPU is configured to perform mathematical and geometric calculation for graphics rendering. The processor 410 may include one or more GPUs that execute program instructions to generate or change display information.

The display 451 may be configured to display an image, a video, and the like. The display 451 may include a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro-OLED, a quantum dot light emitting diode (quantum dot light emitting diodes, QLED), or the like. In some embodiments, the terminal may include one or N displays 451, where N is a positive integer greater than 1.

The terminal may implement a photographing function by using the ISP, the camera 453, the video codec, the GPU, the display 451, the application processor, and the like.

The ISP may be configured to process data fed back by the camera 453. For example, during photographing, a shutter is opened, an optical signal is collected by using the camera 453, then the camera 453 converts the collected optical signal into an electrical signal, and transmits the electrical signal to the ISP for processing, so that the electrical signal is converted into an image visible to a naked eye. The ISP may further perform algorithm optimization on noise, brightness, and a skin color of the image. The ISP may further optimize parameters such as exposure and a color temperature of a photographing scene. In some embodiments, the ISP may be disposed in the camera 453.

The camera 453 may be configured to capture a still image or a video. Generally, the camera 453 includes a lens and an image sensor. An optical image of an object is generated by using the lens and projected onto the image sensor. The image sensor may be a charge coupled device (charge coupled device, CCD) or a complementary metal-oxide-semiconductor (complementary metal-oxide-semiconductor, CMOS) phototransistor. The image sensor converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the terminal may include one or N cameras 453, where N is a positive integer greater than 1.

The key 454 may include a power-on key, a volume key, or the like. The key 454 may be a mechanical key, or may be a touch key. The terminal may receive key input to generate key signal input related to user setting and function control of the terminal.

The sensor module 460 may include one or more sensors such as a touch sensor 460A, a fingerprint sensor 460B, a gyroscope sensor 460C, a pressure sensor 460D, and an acceleration sensor 460E. In some embodiments, the sensor module 460 may further include an environment sensor, a distance sensor, an optical proximity sensor, a bone conduction sensor, and the like.

The touch sensor 460A may also be referred to as a "touch panel". The touch sensor 460A may be disposed in the display 451. A touchscreen includes the touch sensor 460A and the display 451. The touch sensor 460A is configured to detect a touch operation performed on or near the touch sensor 460A. The touch sensor 460A may transmit the detected touch operation to the application processor to determine a touch event type. Visual output related to the touch operation may be provided by using the display 451. In some other embodiments, alternatively, the touch sensor 460A may be disposed on a surface of the terminal, and is located at a position different from that of the display 451.

The fingerprint sensor 460B may be configured to collect a fingerprint. The terminal may implement fingerprint unlocking, application lock access, fingerprint photographing, fingerprint-based call answering, and the like by using a collected fingerprint feature.

The gyroscope sensor 460C may be configured to determine a motion posture of the terminal. In some embodiments, angular velocities of the terminal on three axes (namely, x, y, and z axes) may be determined by using the gyroscope sensor 460C. The gyroscope sensor 460C may be used for photographing stabilization. For example, when a shutter is pressed, the gyroscope sensor 460C detects a jitter angle of the terminal, and calculates, based on the angle, a distance that needs to be compensated for by a lens module, so that the lens eliminates jitter of the terminal through a reverse motion, thereby implementing stabilization. The gyroscope sensor 460C may be further used for navigation and somatosensory game scenarios.

The pressure sensor 460D is configured to sense a pressure signal, and may convert the pressure signal into an electrical signal. In some embodiments, the pressure sensor 460D may be disposed in the display 451. There are many types of pressure sensors 460D, for example, a resistive pressure sensor, an inductive pressure sensor, and a capacitive pressure sensor. The capacitive pressure sensor may include at least two parallel plates having conductive materials. When a force acts on the pressure sensor 460D, a capacitance between electrodes changes. The terminal determines pressure strength based on the change of the capacitance. When a touch operation is performed on the display 451, the terminal detects strength of the touch operation based on the pressure sensor 460D. The terminal may also calculate a touch position based on a detected signal of the pressure sensor 460D. In some embodiments, touch operations that are performed on a same touch position but have different touch operation strength may correspond to different operation instructions. For example, when a touch operation whose touch operation strength is less than a first pressure threshold is performed on a short message service message application icon, an instruction for viewing a short message service message is executed. When a touch operation whose touch operation strength is greater than or equal to the first pressure threshold is performed on the short message service message application icon, an instruction for newly creating a short message service message is executed.

The acceleration sensor 460E may detect a value of an acceleration of the terminal in each direction (usually on three axes). When terminal is still, the acceleration sensor 460E may detect a value and a direction of gravity. The acceleration sensor 460E may be further configured to identify a terminal posture, and is applied to applications such as screen switching between landscape and portrait modes and a pedometer.

In some other embodiments, the processor 410 may further include one or more interfaces. For example, the interface may be the SIM card interface 452. For another example, the interface may be alternatively the USB interface 470. For still another example, the interface may be alternatively an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), or a general-purpose input/output (general-purpose input/output, GPIO) interface. It may be understood that the processor 410 in this embodiment of this application may connect to different modules of the terminal by using interfaces, so that the terminal can implement different functions, for example, photographing and processing. It should be noted that a connection manner of the interface in the terminal is not limited in this embodiment of this application.

The SIM card interface 452 may be configured to connect to a SIM card. The SIM card may be inserted into the SIM card interface 452 or removed from the SIM card interface 452, to implement contact with and separation from the terminal. The terminal may support one or N SIM card interfaces, where N is a positive integer greater than 1. The SIM card interface 452 may support a nano SIM card, a micro SIM card, a SIM card, and the like. A plurality of cards may be inserted into a same SIM card interface 452. The plurality of cards may be of a same type or different types. The SIM card interface 452 may also be compatible with different types of SIM cards. The SIM card interface 452 may also be compatible with an external storage card. The terminal interacts with a network by using the SIM card, to implement functions such as a call and data communication. In some embodiments, the terminal uses an eSIM, namely, an embedded SIM card. The eSIM card may be embedded in the terminal, and cannot be separated from the terminal. For example, when only one SIM card can be inserted into the SIM card interface 452, the terminal may access one cellular network by using the SIM card inserted into the SIM card interface 452. For another example, when two SIM cards can be inserted into the SIM card interface 452, the terminal may access one cellular network separately by using the two SIM cards inserted into the SIM card interface 452.

The USB interface 470 is an interface complying with a USB standard. For example, the USB interface 470 may include a mini USB interface, a micro USB interface, or a USB type-C interface. The USB interface 470 may be configured to connect to a charger to charge the terminal, and may also be configured to transmit data between the terminal and a peripheral device. The USB interface 470 may also be configured to connect to a headset to play audio by using the headset. The USB interface 470 may be further configured to connect to another terminal such as an augmented reality (augmented reality, AR) device.

The charging management module 480 is configured to receive charging input from a charger. The charger may be a wireless charger, or may be a wired charger. In some embodiments of wired charging, the charging management module 480 may receive charging input from the wired charger through the USB interface 470. In some embodiments of wireless charging, the charging management module 480 may receive wireless charging input through a wireless charging coil of the terminal. When charging the battery 482, the charging management module 480 may further supply power to the terminal by using the power management module 481.

The power management module 481 is configured to connect to the battery 482, the charging management module 480, and the processor 410. The power management module 481 receives input from the battery 482 and/or the charging management module 480, and supplies power to the processor 410, the internal memory 421, the external storage, the display 451, the camera 453, the mobile communications module 431, the wireless communications module 432, and the like. The power management module 481 may be further configured to monitor parameters such as a battery capacity, a quantity of battery cycles, and a battery health status (leakage or impedance). In some other embodiments, the power management module 481 may also be disposed in the processor 410. In some other embodiments, the power management module 481 and the charging management module 480 may also be disposed in a same component.

It should be understood that the hardware structure shown in FIG. 4 is only an example. The terminal in this embodiment of this application may have more or fewer components than those shown in the figure, may combine two or more components, or may have different component configurations. Various components shown in the figure may be implemented in hardware that includes one or more signal processors and/or application-specific integrated circuits, in software, or in a combination of hardware and software.

Figure 1:
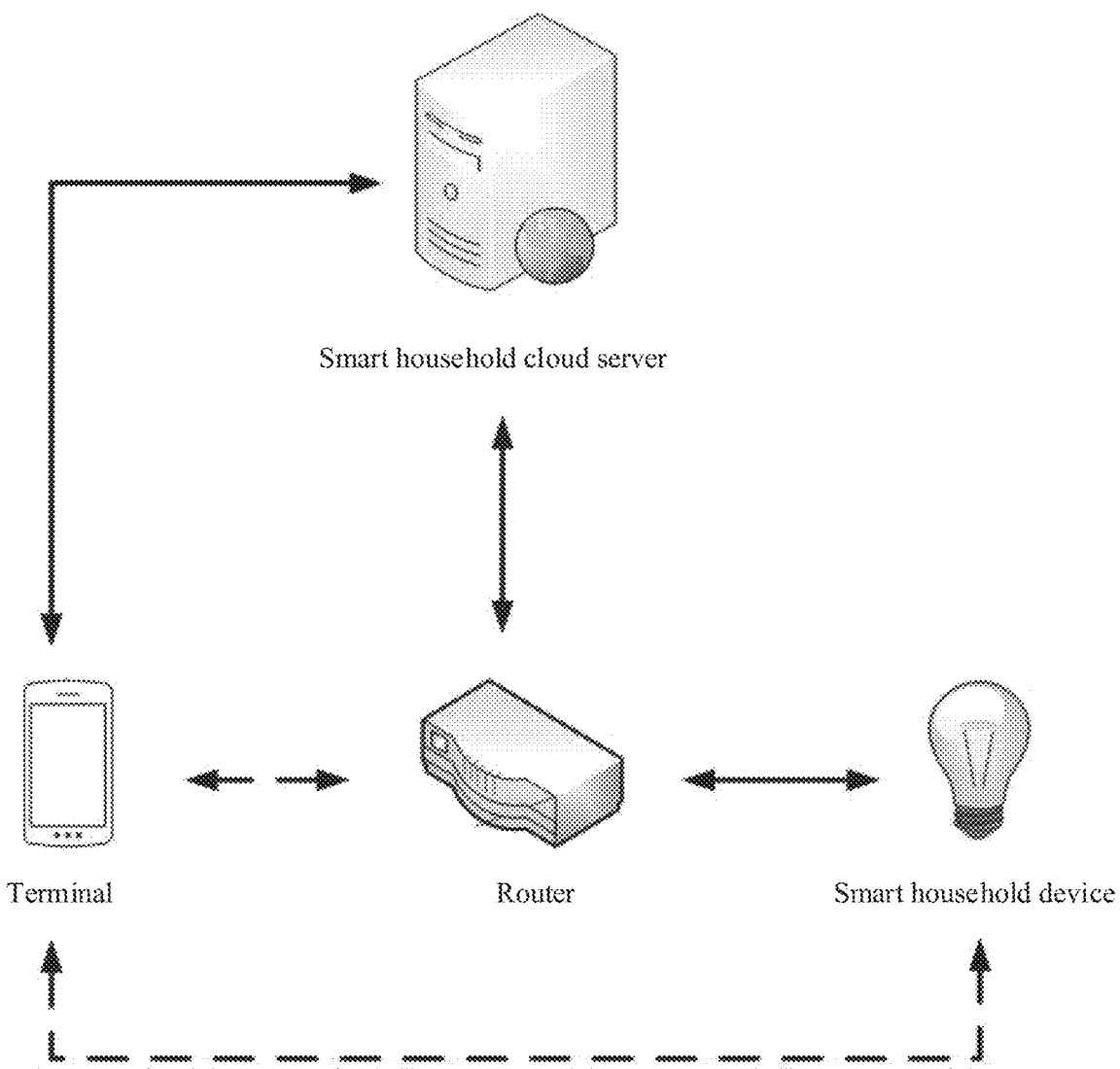
FIG. 1 is a schematic architectural diagram of a communications system.

The following provides detailed descriptions of the embodiments of this application with reference to the schematic structural diagram of the terminal shown in FIG. 1.

Generally, a plurality of applications such as a system application and an application that is installed on the terminal by a user based on a requirement of the user may be installed on the terminal. Specifically, for example, the plurality of applications include an application for controlling a smart household device, a camera, a photo, drawing, presentation, word processing, a game, a phone, a video player, a music player, email, instant messaging, a browser, a calendar, a clock, payment, an application market, a desktop, and health management. It should be noted that the smart household device in the embodiments of this application may include a device such as an electric lamp, a refrigerator, an air conditioner, a sound box, a curtain, a rice cooker, a switch, a router, or an air purifier, and this is not limited.

Figure 5:
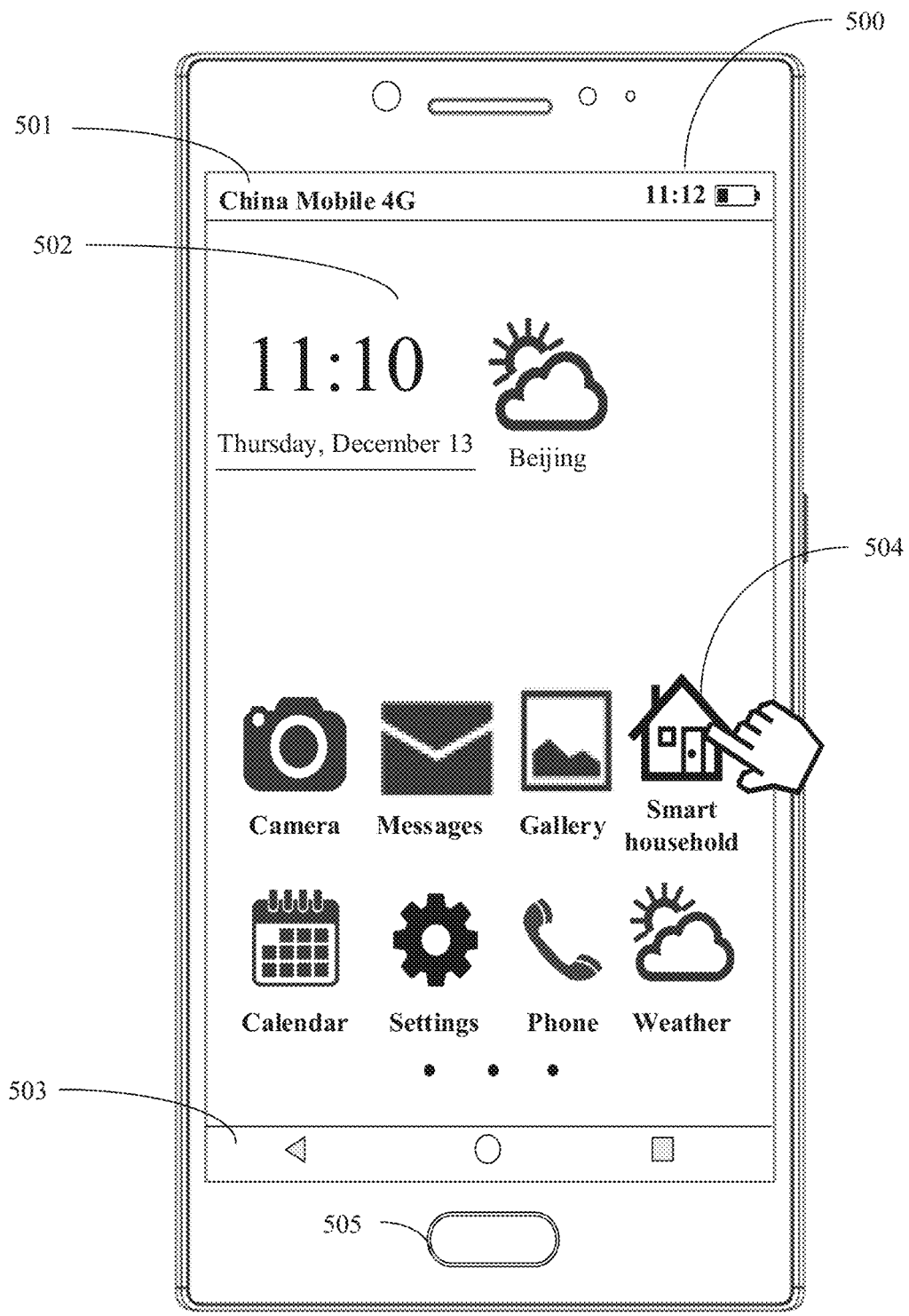
FIG. 5 is a schematic diagram of a graphical user interface according to an embodiment of this application.

For example, FIG. 5 is a schematic diagram of a graphical user interface according to an embodiment of this application. The graphical user interface is referred to as a user interface below. The terminal displays the user interface by using the display 451. Specifically, the user interface may be a home screen, a leftmost screen, a user interface of an application, or the like. For example, the home screen may be a user interface 500 shown in FIG. 5. As shown in the figure, the user interface 500 may include a status bar 501, a time and weather widget 502, a navigation bar 503 that can be hidden, and icons of a plurality of applications such as a smart household icon 504. The status bar 501 may include a name of an operator (China Mobile), a mobile network (for example, 4G), time, and remaining power. In some other embodiments of this application, the status bar 501 may further include one or more of a Bluetooth icon, a Wi-Fi icon, a signal strength icon, a screen lock icon, a peripheral device icon, and the like. The navigation bar 503 may include a back button (back button), a home button (home button), and a menu button (menu button). It may be further understood that in some other embodiments, the user interface 500 may further include a dock bar. The dock bar may include icons of common applications, for example, a phone icon, a messages icon, an email icon, and a weather icon. It should be noted that the user may set the icons of the common applications in the dock bar based on a requirement of the user.

In some other embodiments, as shown in FIG. 5, the terminal may include a home button 505. The home button 505 may be a physical button, or may be a virtual button. In response to an operation performed by the user on the home button 505, the terminal may return to the home screen from a user interface such as a user interface of an application or a leftmost screen displayed on the display 451. In this way, the user can conveniently view the home screen at any time, and perform an operation on a control (for example, an icon) on the home screen. The operation may be specifically that the user presses the home button 505. In some other embodiments of this application, the fingerprint sensor 460B may be further integrated into the home button 505, so that when the user presses the home button 505, the terminal can perform fingerprint collection, to confirm a user identity. In some embodiments, alternatively, the terminal may not include the home button 505.

It should be understood that in this embodiment of this application, after detecting a touch operation performed by a finger (or a stylus) of the user on an icon of an application, the touch sensor 460A of the terminal reports the touch operation to the processor 410, so that in response to the touch operation, the processor 410 starts the application, and displays a user interface of the application on the display 451. For example, after detecting a touch operation on the smart household icon 504, the touch sensor 460A reports the touch operation on the smart household icon 504 to the processor 410, so that in response to the touch operation, the processor 410 starts an application (which may be referred to as a smart household) corresponding to the smart household icon 504, and displays a user interface of the smart household on the display 451. In addition, in this embodiment of this application, the terminal may start the smart household and display the user interface of the smart household on the display 451 in another manner. For example, when a user interface is displayed after a black screen or unlocking or a lock screen is displayed, in response to a voice instruction or a shortcut operation of the user, the terminal may start the smart household, and display the user interface of the smart household on the display 451.

The user interface of the smart household may include various function buttons such as a device adding button. In some embodiments, the user interface of the smart household may further include an option and the like of an added smart household device. Specifically, the option of the added smart household device may include a name, an icon, a control button (for example, an on/off button), or the like of the smart household device. For example, the user interface of the smart household may be a user interface 600 shown in FIG. 6. The user interface 600 includes a device adding button 601, an option of an added electric lamp, and an option of an added air purifier. For example, the electric lamp is used as an example. The user may perform a corresponding operation on the option of the added electric lamp, to control the electric lamp, for example, turn off the electric lamp, turn on the electric lamp, or adjust brightness of the electric lamp. In addition, the user may further add a corresponding smart household device by performing an operation on the adding button 601, so that the terminal implements control on the smart household device. In some other embodiments, the terminal may further delete the option of the added smart household device in the user interface 600 in response to an operation of the user, to remove the control of the terminal on the smart household device.

Generally, after accessing a network (for example, a network such as 2G, 3G, 4G, 5G, or Wi-Fi), the terminal device may send, in response to an operation performed by the user on the user interface of the smart household, an instruction for controlling the smart household device to the smart household device by using a smart household cloud server. Only after accessing the network and registering with the smart household cloud server, the smart household device can receive the instruction sent by the smart household cloud server and execute the instruction, so that the user implements control on the smart household device by performing an operation on the terminal. The smart household device may access the network by using a wireless access point (access point, AP). For example, the AP may be a router, or may be another device that can be used to access the network, for example, a mobile phone, a tablet computer, or a notebook computer. When the AP is a router, an architectural diagram of a communications system in this embodiment of this application may be shown in FIG. 1.

Figure 2:
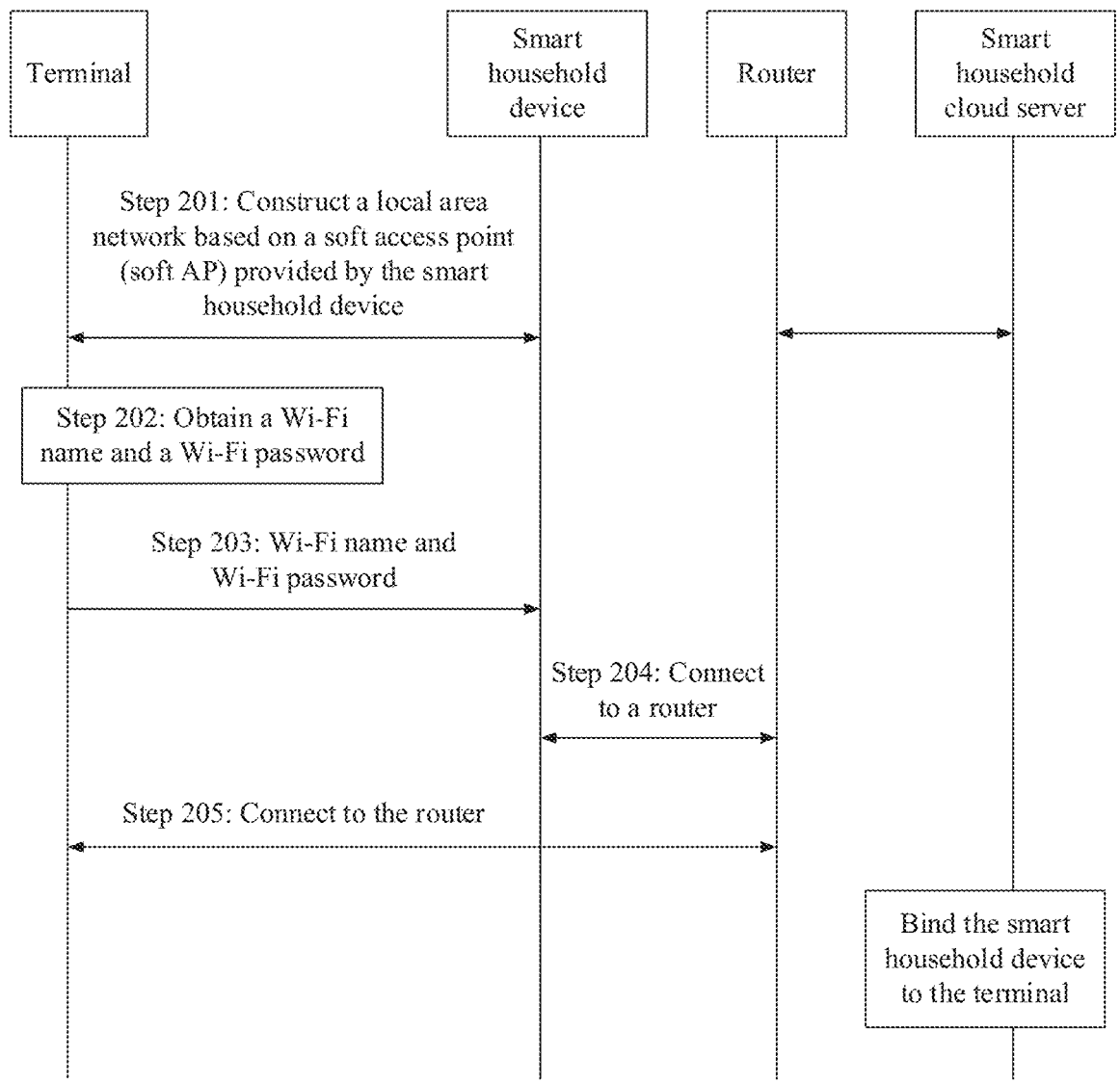
FIG. 2 is a schematic diagram of a network configuration procedure based on a soft AP mode.
Figure 3:
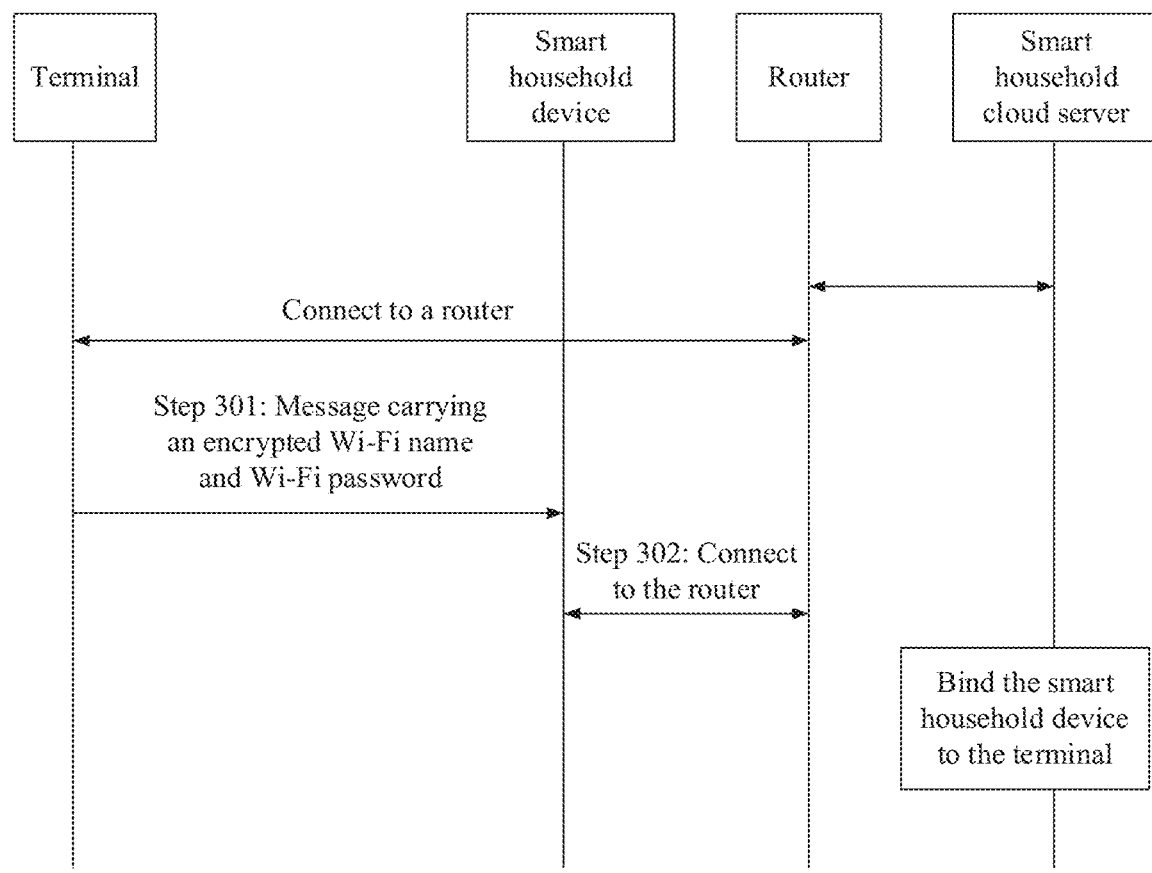
FIG. 3 is a schematic diagram of a network configuration procedure based on a smart config mode.

It should be noted that in this embodiment of this application, when accessing the network, the terminal may be connected to a same router as the smart household device, or may be connected to a different router than the smart household device. For example, the user may control, by connecting to a network of an office, a smart household device connected to a network at home of the user. In this embodiment of this application, the smart household device is connected to the router through a network configuration procedure when being started for the first time, to access the network and register with the smart household cloud server. Specifically, for the network configuration procedure of the smart household device, refer to a network configuration procedure in the current technology, for example, a network configuration procedure shown in FIG. 1 or FIG. 2.

However, considering network security, a Wi-Fi name and a Wi-Fi password are usually configured on the AP. The smart household device accesses the network based on the Wi-Fi name and the Wi-Fi password by using the AP. Once the Wi-Fi password or the Wi-Fi name on the AP side changes, the smart household device is disconnected from the network. Consequently, the user cannot control the smart household device by using the smart household APP installed on the terminal. In the current technology, a smart household device is manually reset, and then a network configuration procedure is performed to enable the smart household device to access a network again. Therefore, operations are relatively cumbersome, and user experience is relatively poor. In view of these, the embodiments of this application provide a method for controlling a smart household device to connect to a network.

Figure 7:
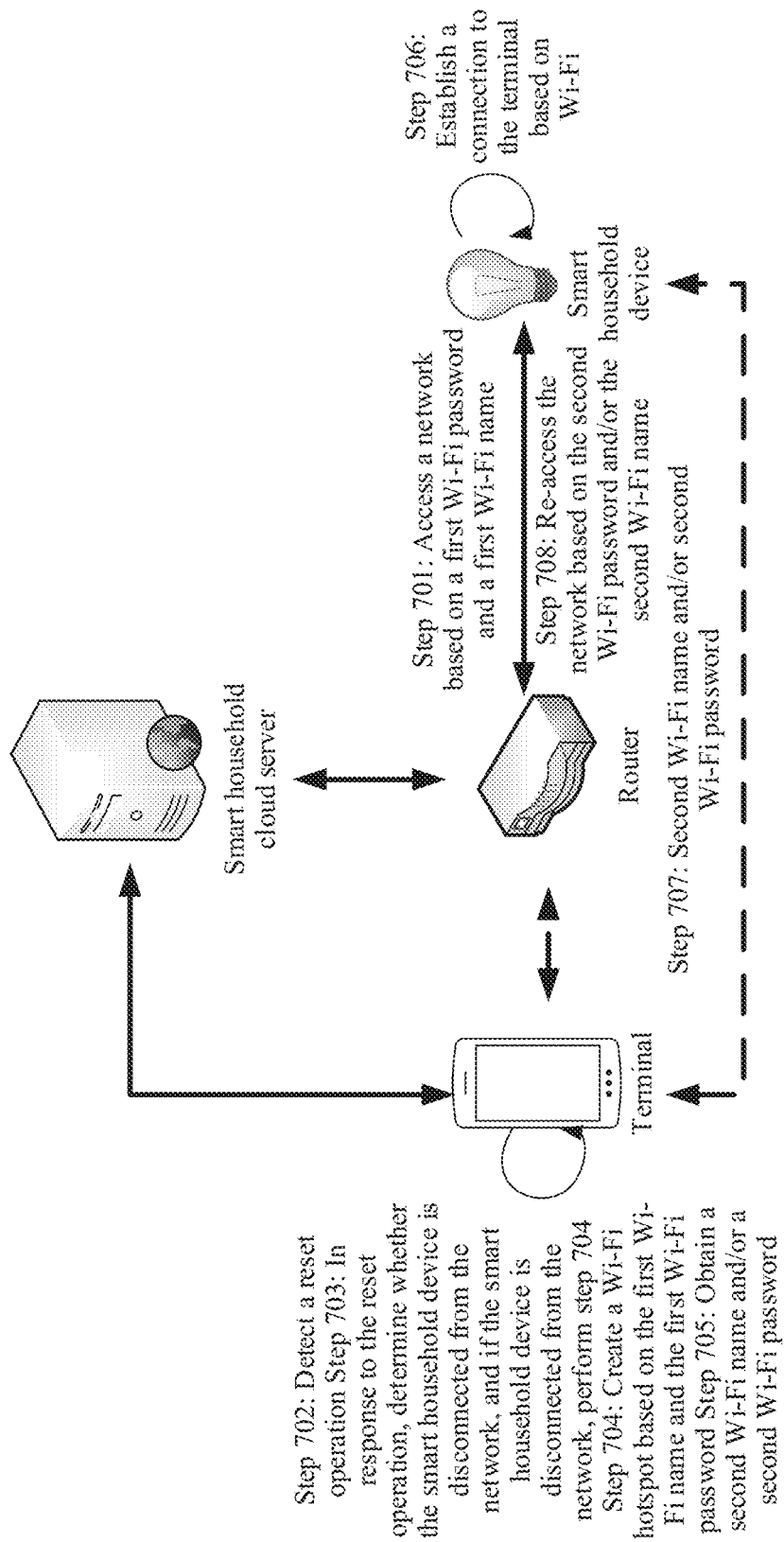
FIG. 7 is a schematic flowchart of a method for controlling a smart household device to connect to a network according to an embodiment of this application.

For example, FIG. 7 is a schematic flowchart of a method for controlling a smart household device to connect to a network according to an embodiment of this application. The method specifically includes the following steps.

Step 701: A smart household device establishes a connection to an AP based on a first Wi-Fi name and a first Wi-Fi password, accesses a network, and registers with a smart household cloud server, to implement binding to a terminal, so that a user can control the smart household device by using the terminal. A Wi-Fi name preconfigured on the AP is the first Wi-Fi name, and a Wi-Fi password preconfigured on the AP is the first Wi-Fi password.

It should be understood that in this embodiment of this application, the smart household device is in a network connected state after accessing the network.

It should be noted that w % ben the AP in this embodiment of this application is a router, the Wi-Fi name may also be referred to as a service set identifier (service set identifier, SSID) of the router, and the Wi-Fi password may also be referred to as a password (PWD for short). The SSID and the PWD of the router may be set by default, or may be set by the user. For example, the SSID preconfigured on the router may be wifi_old, and the preconfigured PWD may be 123. When a device with a Wi-Fi function, for example, a smart household device or a terminal, is in a station mode, the device may be connected to the corresponding router based on wifi_old and 123 to access the network.

It should be understood that, in some embodiments, the smart household device in step 701 may access the network for the first time. Specifically, the smart household device may access the network based on a network configuration procedure shown in FIG. 1 or FIG. 2. In addition, in some other embodiments, alternatively, the smart household device may not access the network for the first time. A method for accessing the network by the smart household device may be the method for controlling a smart household device to access a network in this embodiment of this application, or may be another method, and this is not limited.

Figure 6:
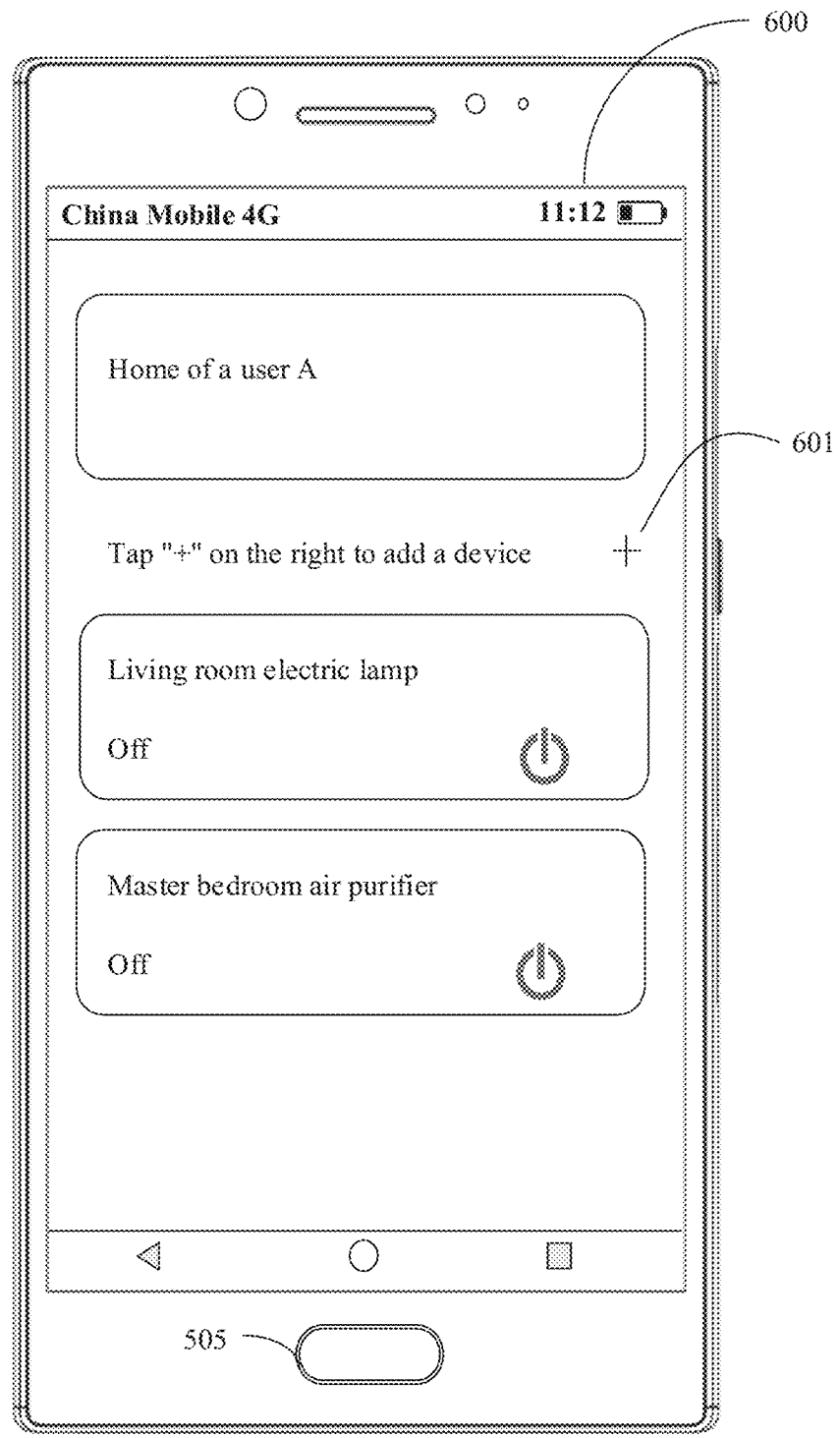
FIG. 6 is a schematic diagram of another user interface according to an embodiment of this application.

After the smart household device is successfully bound to the terminal on the smart household cloud server, the terminal successfully adds a corresponding smart household device option to a user interface of a smart household. For example, the user interface of the smart household is shown in FIG. 6. If a living room electric lamp is successfully bound to the terminal on the smart household cloud server, the terminal adds a living room electric lamp option to the user interface 600 of the smart household, so that the user can control the living room electrical lamp by performing an operation on the living room electric lamp.

However, the terminal controls the smart household device on the premise that the smart household device accesses the network. After the smart household device is disconnected from the network, the user cannot control the smart household device by using the terminal. Specifically, generally, the smart household device is disconnected from the network because the Wi-Fi name and/or the Wi-Fi password on the AP side change or changes. However, after the Wi-Fi password and/or the Wi-Fi name on the AP side change or changes, the smart household device still continually attempts to establish a connection to the AP based on the first Wi-Fi name and the first Wi-Fi password to access the network. However, because the first Wi-Fi name and the first Wi-Fi password cannot be verified by the AP, the smart household device cannot access the network.

It should be noted that in this embodiment of this application, in an example in which the AP is a router, manually changing a Wi-Fi name and/or a Wi-Fi password preconfigured on the router, replacing the router, and the like may cause a change of the Wi-Fi password and/or the Wi-Fi name required for accessing the network by the smart household device. For example, the user may periodically change the Wi-Fi password of the router to prevent another person from stealing the Internet. For another example, after an original router is damaged and replaced with a new router, a Wi-Fi password and/or a Wi-Fi name configured on the new router are or is different from those or that of the original router.

In this embodiment of this application, after being disconnected from the network, the smart household device may re-access the network through the following steps.

Step 702: The terminal detects a reset operation of the user.

Figure 8A:
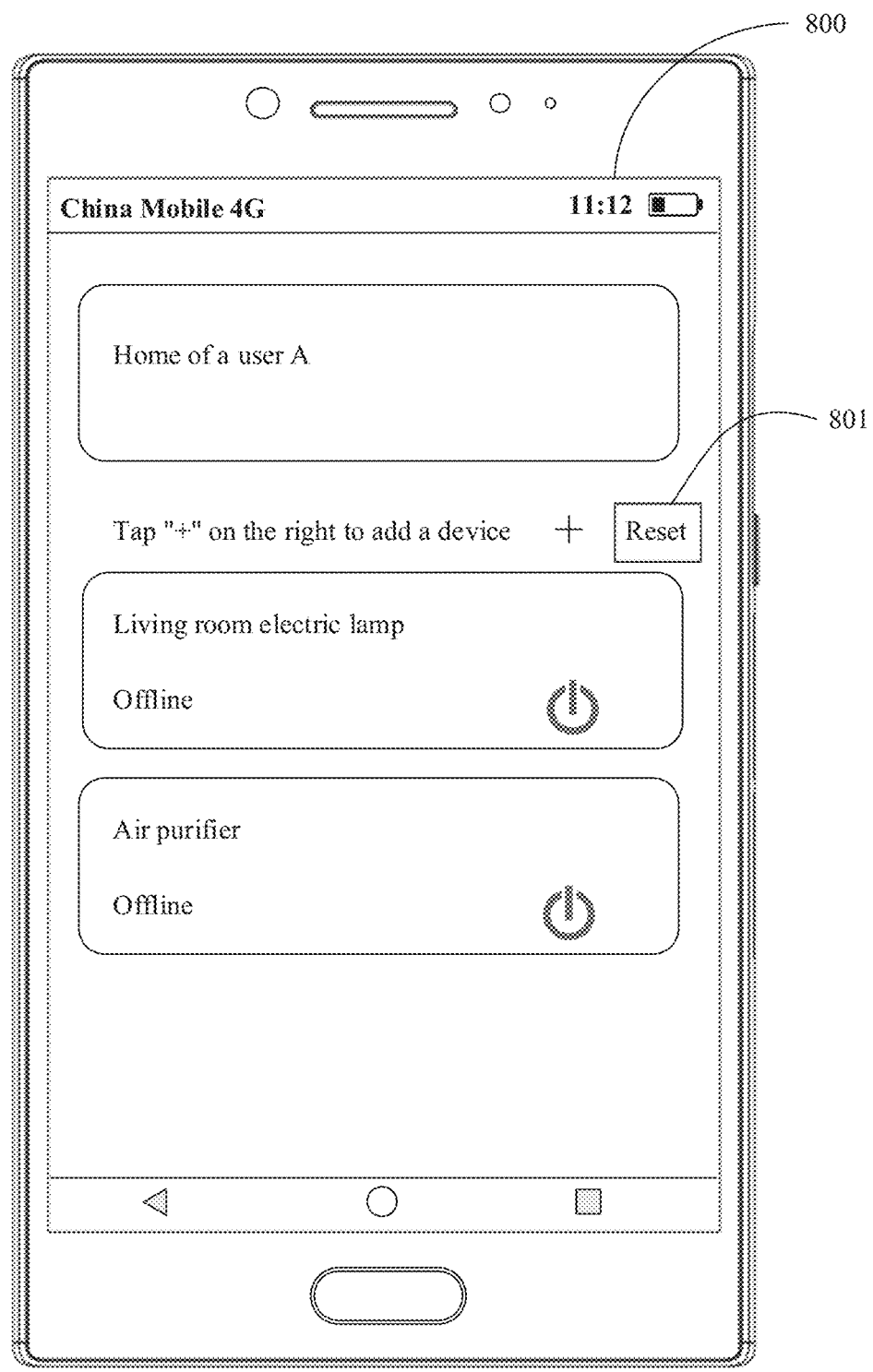
FIG. 8a is a schematic diagram of another user interface according to an embodiment of this application.

For example, the reset operation may be an operation performed by the user on the virtual button in the user interface of the smart household, may be a voice instruction, or may be a shortcut gesture operation. For example, as shown in FIG. 8*a*, the terminal displays a user interface 800 on the display 451. If the terminal detects an operation performed by the user on a reset button 801, the terminal performs a step of determining whether the living room electric lamp and an air purifier are disconnected from the network. In this embodiment of this application, FIG. 8*a* is merely an example for description. In this embodiment of this application, a name of the virtual button used by the user to trigger the determining of whether the smart household device is disconnected from the network may be alternatively network disconnection detection or the like, and this is not limited. For another example, when another interface (for example, the user interface of the smart household) is displayed after a black screen or unlocking or a lock screen is displayed on the display 451, the terminal may further trigger, in response to a voice instruction or a shortcut gesture operation of the user, the step of determining whether the smart household device is disconnected from the network.

Figure 9:
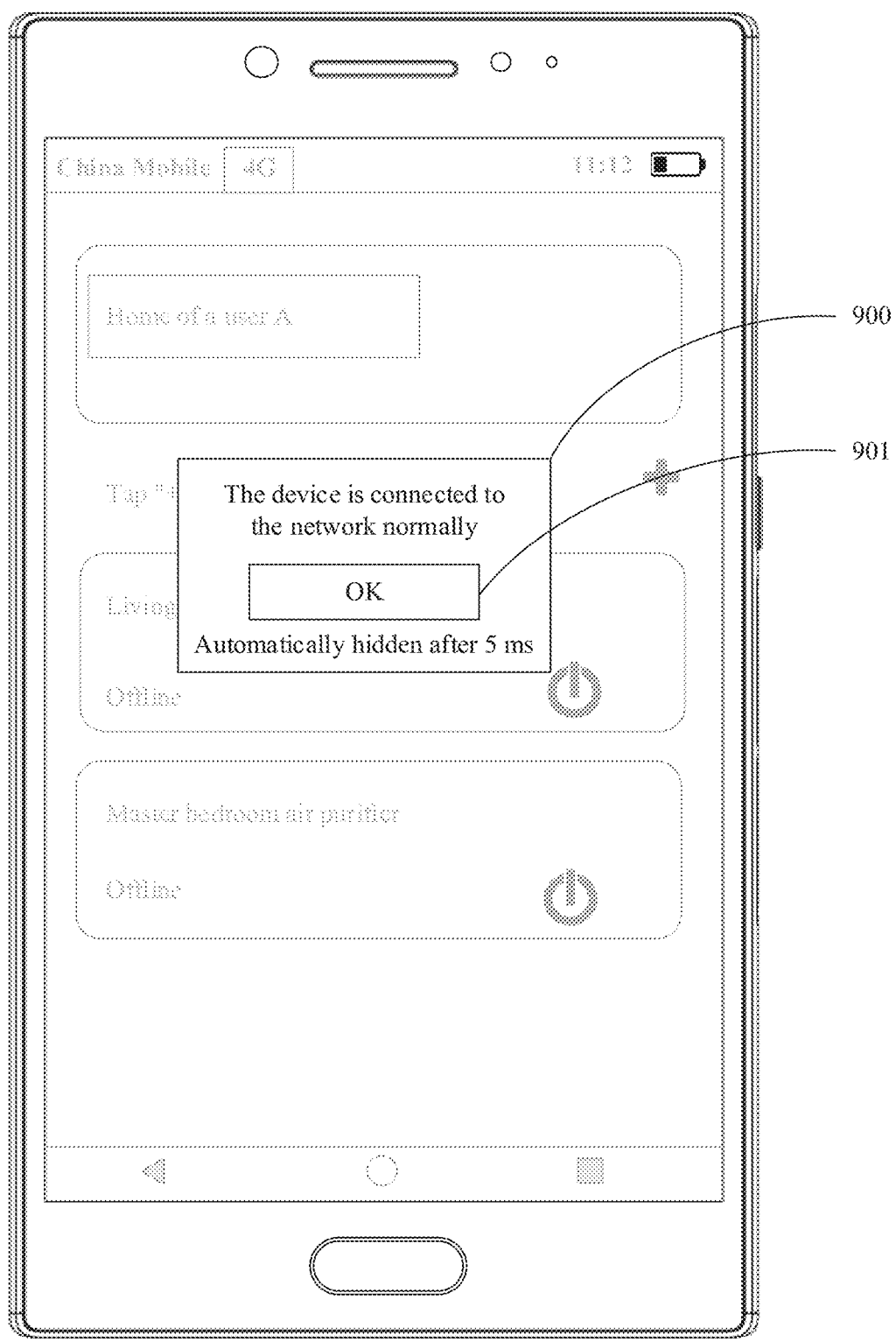
FIG. 9 is a schematic diagram of a reminder box according to an embodiment of this application.

Step 703: In response to the reset operation, the terminal determines whether the smart household device is disconnected from the network. If the smart household device is disconnected from the network, step 704 is performed. If the smart household device is not disconnected from the network, this procedure ends. It should be noted that, in this embodiment of this application, if the terminal determines that the smart household device is not disconnected from the network, the terminal may further continue to determine whether the smart household device is disconnected from the network. If the terminal still determines, after preset duration, that the smart household device is not disconnected from the network, this procedure ends. The preset duration may be set based on a requirement of the user, or may be set by default. In some other embodiments, if the terminal determines that the smart household device is not disconnected from the network, the terminal may further remind the user that the smart household device is connected to the network normally. For example, the terminal may display a reminder box on the display 451, where the reminder box is used to indicate that the smart household device is connected to the network normally. For example, as shown in FIG. 9, the terminal displays a reminder box 900 on the display 451, where the reminder box 900 includes reminder information indicating that the smart household device is connected to the network normally. For example, the reminder box 900 may further include preset duration, and the terminal may automatically hide the reminder box 900 after the reminder box 900 is displayed for the preset duration. For example, the preset duration may be 3s or 5s, and may be preconfigured in the terminal, and the reminder information may be hidden in response to an operation of the user. FIG. 9 is used as an example. The reminder box may further include a virtual button 801, and the terminal may hide the reminder box 901 in response to tapping the virtual button 901 by the user. For another example, the terminal may alternatively remind, through voice playing, the user that the smart household device is connected to the network normally.

Figure 8B:
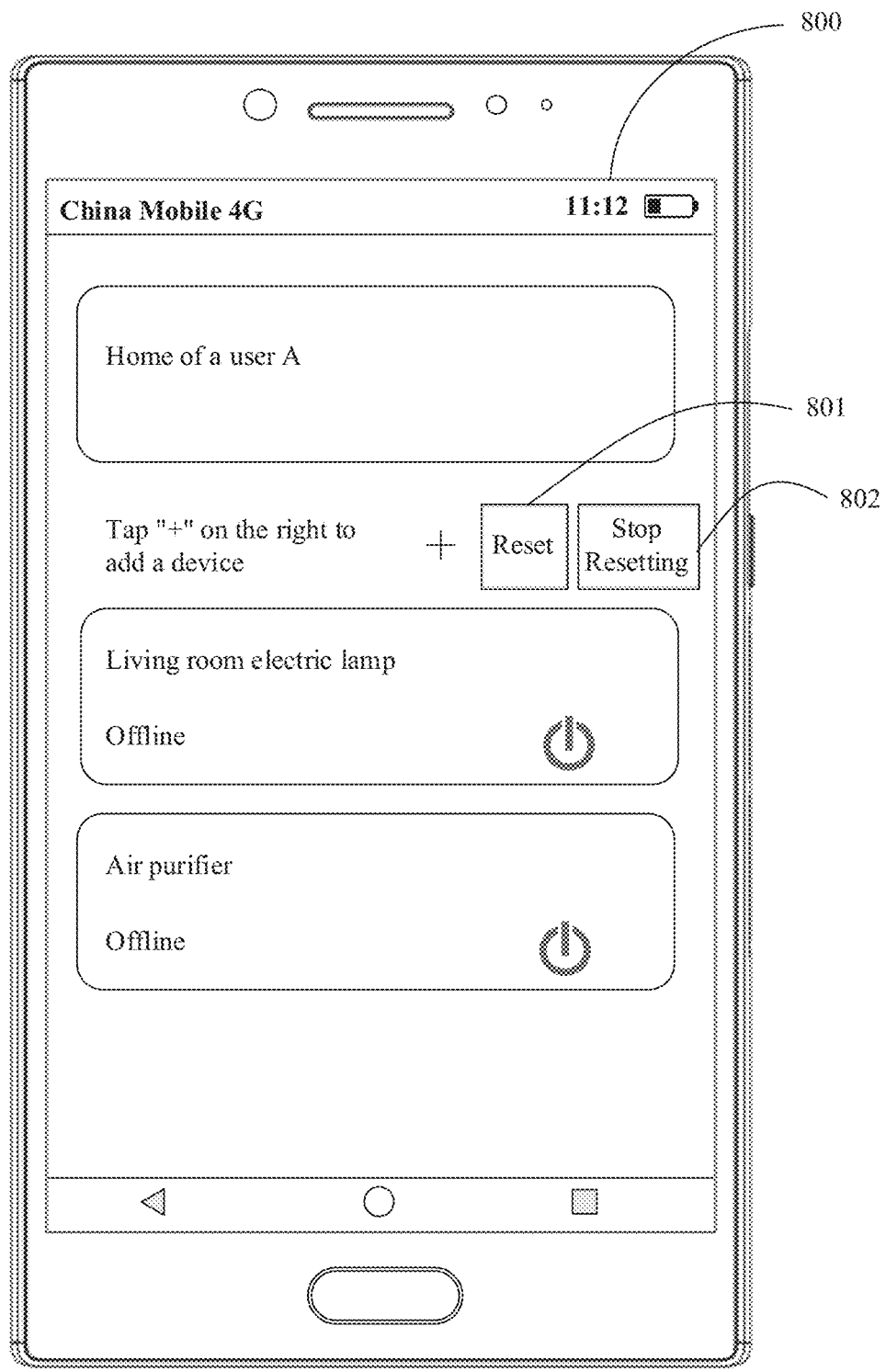
FIG. 8b is a schematic diagram of another user interface according to an embodiment of this application.
Figure 10:
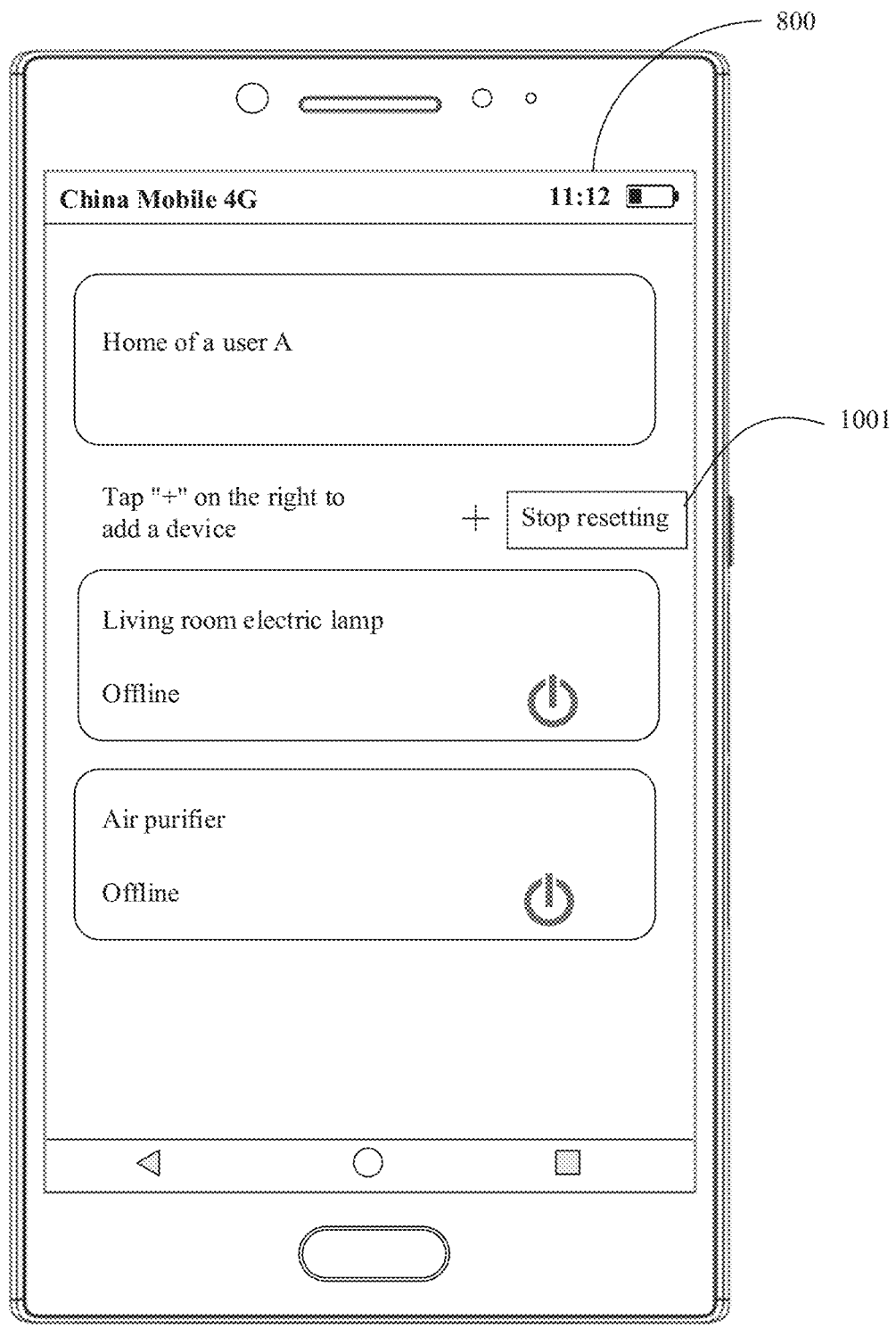
FIG. 10 is a schematic diagram of another user interface according to an embodiment of this application.

In some other embodiments, in response to an operation of the user, the terminal may also stop performing the method in this embodiment of this application. For example, when determining that the smart household device is not disconnected from the network, the terminal continues to determine whether the smart household device is disconnected from the network, and in response to an operation of the user, may stop performing the operation of continuing to determine whether the smart household device is disconnected from the network. For another example, when the smart household device is disconnected from the network, the terminal performs step 704, and stops performing step 704 when detecting an operation of the user. Specifically, the operation of the user may be an operation of stopping the reset button, or may be a voice instruction, a shortcut gesture, or the like for stopping resetting. For example, when displaying the user interface 800 shown in FIG. 8*a*, the terminal detects an operation performed by the user on the reset button 801, in response to the operation performed on the reset button 801, triggers the step of determining whether the smart household device is disconnected from the network, and updates the reset button 801 to a reset stopping button 1001, as shown in FIG. 10. If the terminal detects an operation of the user on the reset stopping button 1001, the terminal stops performing the method in this embodiment of this application in response to the operation on the reset stopping button 1001. A user interface 800 shown in FIG. 8*b* is used as an example. In some other embodiments, the user interface 800 includes a reset button 801 and a reset stopping button 802. The reset button 801 and the reset stopping button 802 are two different virtual buttons. The reset button 801 is used to trigger performing of the method for controlling a smart household device to connect to a network in this embodiment of this application, and the reset stopping button 802 is used to trigger suspension of the method for controlling a smart household device to connect to a network in this embodiment of this application.

In addition, this embodiment of this application further provides some specific manners in which the terminal determines whether the smart device is disconnected from the network.

For example, the terminal may detect whether a network disconnection notification of the smart household device that is sent by the smart household cloud server is received, and if the network disconnection notification of the smart household device that is sent by the smart household cloud server is received, determine that the smart household device is disconnected from the network. The smart household cloud server may periodically send a heartbeat message to the smart household device. After the smart household cloud server sends the heartbeat message to the smart household device, if the smart household cloud server has not received, within preset duration, a heartbeat response sent by the smart household device, the smart household cloud server determines that the smart household device is disconnected from the network, and sends the network disconnection notification of the smart household device to the terminal. It should be noted that the preset duration may be determined based on an actual case, for example, 10 ms. In addition, when the smart household device receives a smart household device control command sent by the terminal, if the smart household device fails to send the command to the smart household device, the smart household device may determine that the smart household device is disconnected from the network, and returns the network disconnection notification of the smart household device to the terminal.

For another example, in an example in which the AP connected to the smart household device is a router, after detecting that a Wi-Fi name and/or a Wi-Fi password of the router are or is changed by using a smart household APP or another application, the terminal may determine that the smart household device is disconnected from the network.

It should be noted that, in this embodiment of this application, it may be determined, in another manner, whether the smart household device is disconnected from the network, and this is not limited.

Step 704: The terminal creates a Wi-Fi hotspot based on the first Wi-Fi name and the first Wi-Fi password.

In some other embodiments of this application, the terminal may further periodically and automatically trigger determining of whether the smart household device is disconnected from the network. Specifically, a cycle for determining whether the smart household device is disconnected from the network by the terminal may be configured based on an actual case before the device is delivered from the factory, for example, 10s or 5s, or may be configured based on a requirement of the user, and this is not limited. In particular, without considering power consumption of the terminal, the terminal may determine, in real time, whether the smart household device is disconnected from the network.

Figure 11:
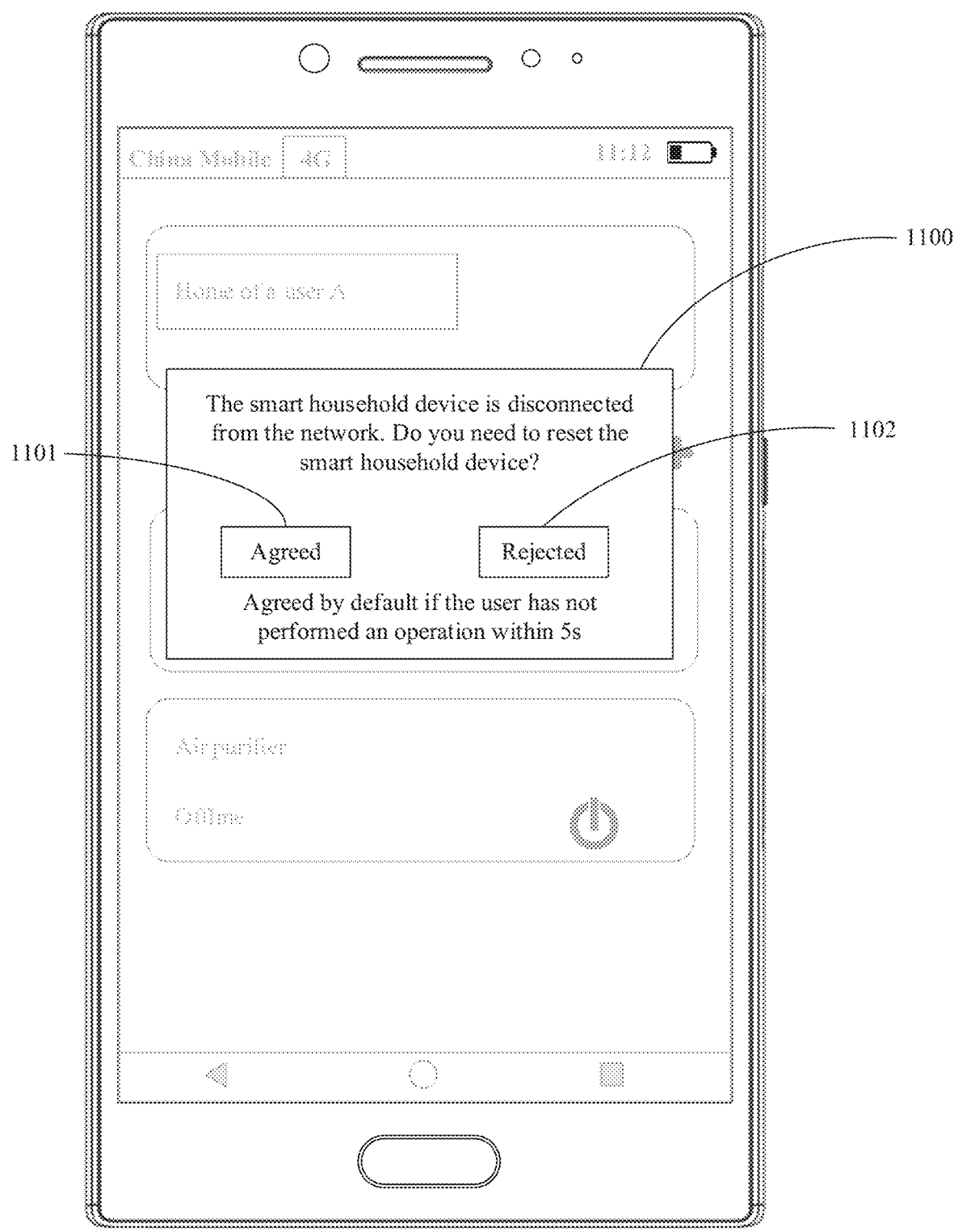
FIG. 11 is a schematic diagram of another reminder box according to an embodiment of this application.

After the smart household device is disconnected from the network, the terminal may remind the user whether to reset the smart household device. For example, the terminal may remind, through voice playing, the user whether to reset the smart household device. For example, the terminal may play a reminder tone of "Do you need to reset the smart household device", and in response to a voice instruction "Agreed", "Confirmed", or "OK" that the user replies, the terminal may perform the step of creating the Wi-Fi hotspot based on the first Wi-Fi name and the first Wi-Fi password. In response to a voice instruction "Rejected", "Disagreed", or "No" that the user replies, the terminal may not perform the step of creating the Wi-Fi hotspot, and this procedure ends. For another example, as shown in FIG. 11, the terminal may display a reminder box 1100 on the display 451. The reminder box 1100 includes reminder information used to reminder the user whether to reset the smart household device, a virtual button 1101, and a virtual button 1102. The virtual button 1101 is a virtual button for agreeing resetting, and the virtual button 1102 is a virtual button for rejecting resetting. In response to an operation performed by the user on the virtual button 1101, the terminal may perform the step of creating the Wi-Fi hotspot based on the first Wi-Fi name and the first Wi-Fi password. In response to an operation performed by the user on the virtual button 1102, the terminal may not perform the step of creating the Wi-Fi hotspot. In some other embodiments, the reminder box 1100 may further include reminder information reminding the user that resetting is agreed or rejected by default if an operation of the user has not been detected within preset duration (for example, 5s).

In some embodiments, after determining that the smart household device is disconnected from the network, the terminal may further obtain a geographical location of the terminal, and then determine whether a distance between a geographical location of the smart household device and the geographical location of the terminal falls within a preset range, and if the distance falls within the preset range, the terminal creates the Wi-Fi hotspot based on the first Wi-Fi name and the first Wi-Fi password. Therefore, a possibility that the terminal successfully establishes a connection to the smart household device by using the created Wi-Fi hotspot is improved. The geographical location of the smart household device may be prestored in the terminal. For example, when the smart household device is in a fixed location or a small movement area range, the geographical location may be obtained and stored in the terminal when a network configuration procedure is performed for the first time. For another example, the geographical location of the smart household device may be alternatively automatically obtained by the terminal after the terminal determines that the smart household device is disconnected from the network. A manner of obtaining the geographical location of the smart household device is not limited in this embodiment of this application. It should be noted that the preset range may be determined based on network coverage of the Wi-Fi hotspot.

It should be noted that the first Wi-Fi name and the first Wi-Fi password are prestored in the terminal. The terminal may create the Wi-Fi hotspot based on the first Wi-Fi name and the first Wi-Fi password by using the smart household APP, or may create the Wi-Fi hotspot based on the first Wi-Fi name and the first Wi-Fi password by using a system application (for example, Wi-Fi setting). In this embodiment of this application, the Wi-Fi hotspot may be created in another manner, and this is not limited.

In some other embodiments, after the terminal determines that the smart household device is disconnected from the network, if the distance between the geographical location of the smart household device and the geographical location of the terminal falls beyond the preset range, the terminal no longer creates the Wi-Fi hotspot, and this procedure ends.

Step 705: The terminal obtains a second Wi-Fi name and/or a second Wi-Fi password.

Specifically, there is no absolute sequence between step 704 and step 705, and step 704 and step 705 may be performed at the same time, or step 704 may be performed before step 705, or step 705 may be performed before step 704. It should be noted that regardless of which of step 704 and step 705 is first performed, the terminal performs the step only after detecting an operation of the user for agreeing resetting. Therefore, a possibility that the terminal controls the smart household device to successfully connect to the network is improved.

In this embodiment of this application, the terminal may obtain the second Wi-Fi name and/or the second Wi-Fi password in the following manner.

For example, after determining, by using an APP (for example, the smart household APP) installed on the terminal, that the smart household device is disconnected from the network, the terminal may display a Wi-Fi name and password input box. The user may enter the second Wi-Fi name and the second Wi-Fi password in the displayed Wi-Fi name and password input box, so that the terminal can obtain the second Wi-Fi name and/or the second Wi-Fi password from the Wi-Fi name and password input box.

Figure 12:
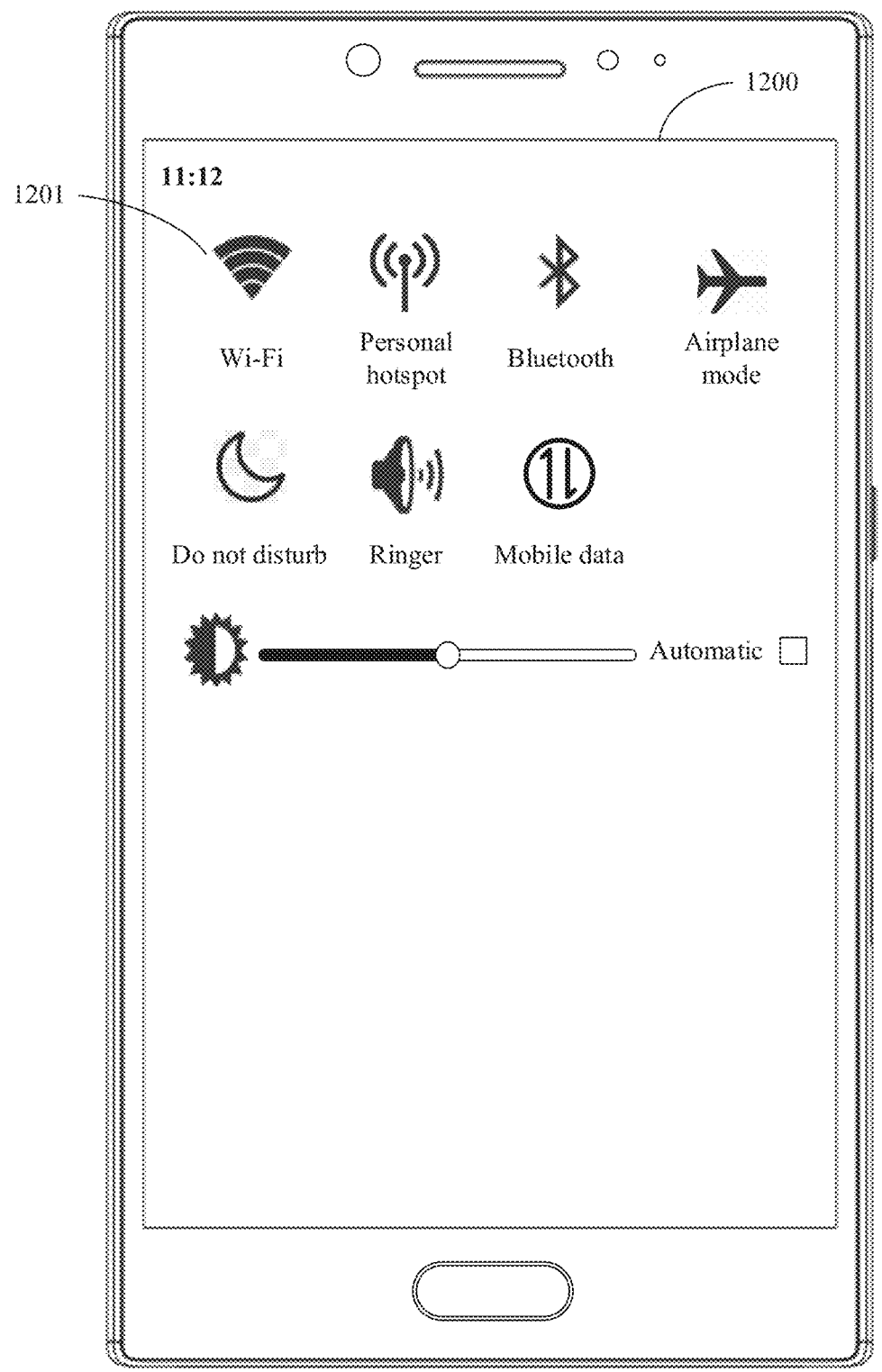
FIG. 12 is a schematic diagram of another user interface according to an embodiment of this application.

For example, the terminal may enable a Wi-Fi function in response to an operation of the user, and the terminal may display a Wi-Fi password input box in response to selecting the second Wi-Fi name by the user, and access a corresponding Wi-Fi network in response to entering the second Wi-Fi password by the user. Therefore, the terminal can prestore the selected second Wi-Fi name and the second Wi-Fi password in a corresponding memory, for example, an internal memory or another memory. After determining, by using the smart household APP, that the smart household device is disconnected from the network, the terminal may obtain the second Wi-Fi name and/or the second Wi-Fi password from the internal memory. For example, as shown in FIG. 12, when the screen displays a user interface 1200, the terminal may enable the Wi-Fi function in response to an operation performed by the user on a virtual button 1201. In this embodiment of this application, the Wi-Fi function may be enabled through another user operation such as a voice instruction.

In addition, in this embodiment of this application, the second Wi-Fi name and/or the second Wi-Fi password may be obtained in another manner, and this is not limited.

It should be noted that, in this embodiment of this application, when the first Wi-Fi name and the second Wi-Fi name are the same, the first Wi-Fi password and the second Wi-Fi password are different; when the first Wi-Fi password and the second Wi-Fi password are the same, the first Wi-Fi name and the second Wi-Fi name are different; and in addition, the first Wi-Fi name and the second Wi-Fi name are different, and the first Wi-Fi password and the second Wi-Fi password are different.

Step 706: After being disconnected from the network, the smart household device may access, based on the first Wi-Fi name and the first Wi-Fi password, the Wi-Fi hotspot created by the terminal, to connect to the terminal.

It should be noted that in this embodiment of this application, because the smart household device continually attempts to connect to the network based on the first Wi-Fi password and the first Wi-Fi name when the smart household device is disconnected from the network because the Wi-Fi password and/or the Wi-Fi name on the AP side change or changes, the smart household device can access the Wi-Fi hotspot after the terminal creates the Wi-Fi hotspot based on the first Wi-Fi password and the first Wi-Fi name, to establish a connection to the terminal.

Step 707: The terminal sends the second Wi-Fi name and/or the second Wi-Fi password to the smart household device based on the Wi-Fi hotspot.

It should be noted that the terminal may send both the second Wi-Fi name and the second Wi-Fi password to the smart household device, or may send one of the second Wi-Fi name and the second Wi-Fi password to the smart household device. For example, when the first Wi-Fi name and the second Wi-Fi name are the same, but the first Wi-Fi password and the second Wi-Fi password are different, the terminal may send only the second Wi-Fi password to the smart household device. For another example, when the first Wi-Fi name and the second Wi-Fi name are different, but the first Wi-Fi password and the second Wi-Fi password are the same, the terminal may send only the second Wi-Fi name to the smart household device. However, when the first Wi-Fi name and the second Wi-Fi name are different, and the first Wi-Fi password and the second Wi-Fi password are different, the terminal needs to send both the second Wi-Fi name and the second Wi-Fi password to the smart household device. For example, if the first Wi-Fi name is WiFi_old, the first Wi-Fi password is 123, the second Wi-Fi name is WiFi_new, and the second Wi-Fi password is 456, the terminal sends both WiFi_new and 456 to the smart household device.

In some embodiments, the terminal may automatically disable the Wi-Fi hotspot after sending the second Wi-Fi password and/or the second Wi-Fi name to the smart household device, so that power consumption of the terminal is reduced.

For example, after sending the second Wi-Fi password and/or the second Wi-Fi name to the smart household device, the terminal may determine whether the smart household device re-accesses the network, and automatically disable the Wi-Fi hotspot after the smart household device re-accesses the network, so that reliability of controlling the smart household device to access the network is improved.

For example, after receiving the second Wi-Fi password and/or the second Wi-Fi name, the smart household device may further send a response indicating that the second Wi-Fi password and/or the second Wi-Fi name are or is received to the terminal. After receiving the response that indicates that the second Wi-Fi password and/or the second Wi-Fi name are or is received and that is sent by the smart household device, the terminal determines that the smart household device re-accesses the network, and therefore automatically disables the Wi-Fi hotspot.

For another example, the terminal may alternatively automatically disable the Wi-Fi hotspot after preset duration is reached after the Wi-Fi hotspot is created. The preset duration is preconfigured in the terminal based on an actual case. For example, the preset duration may be 10 minutes or 15 minutes. Generally, the preset duration cannot be less than duration in which the terminal sends the second Wi-Fi password and/or the second Wi-Fi name to the smart household device.

Step 708: After receiving the second Wi-Fi password and/or the second Wi-Fi name, the smart household device updates the first Wi-Fi name and the first Wi-Fi password to the second Wi-Fi name and the second Wi-Fi password, establishes a connection to an AP based on the second Wi-Fi name and the second Wi-Fi password, and re-accesses the network to register with the smart household cloud server. Therefore, the user can control the smart household device by using the smart household APP installed on the terminal.

It should be noted that in this embodiment of this application, the smart household device breaks the Wi-Fi hotspot-based connection to the terminal after updating the first Wi-Fi name and the first Wi-Fi password to the second Wi-Fi name and the second Wi-Fi password. In addition, in this embodiment of this application, the smart household device may alternatively break the Wi-Fi hotspot-based connection to the terminal after the terminal disables the Wi-Fi hotspot.

It should be further noted that in an example in which the AP is a router, in this embodiment of this application, a router to which the smart household device is connected based on the first Wi-Fi name and the first Wi-Fi password and a router to which the smart household device is connected based on the second Wi-Fi name and the second Wi-Fi password may be a same router, or may be different routers. For example, in this embodiment of this application, when the first Wi-Fi password of the router connected to the smart household device is changed to the second Wi-Fi password, and/or the first Wi-Fi name is changed to the second Wi-Fi name, the smart household device are connected to a same router before and after the Wi-Fi password and/or the Wi-Fi name are or is changed. However, in this embodiment of this application, after the router to which the smart household device is connected based on the first Wi-Fi password and the first Wi-Fi name is disabled or powered off in this embodiment of this application, the smart household device can establish a connection to another router based on the second Wi-Fi password and the second Wi-Fi name, to access the network.

In this embodiment of this application, when the smart household device is disconnected from the network because the Wi-Fi password and/or the Wi-Fi name on the AP side change or changes, in the method for controlling a smart household device to connect to a network in this embodiment of this application, the smart household device can access the network again. In comparison with the current technology, no manual resetting or network configuration procedure is required, so that network connection efficiency of the smart household device is improved, user operations are further reduced, and user experience is improved.

In the embodiments of this application, the foregoing embodiments may be separately used, or may be mutually used to implement different functions.

In the foregoing embodiments provided in this application, the method provided in the embodiments of this application is described from the perspective of execution bodies of the terminal and the smart household device. To implement functions in the foregoing method provided in the embodiments of this application, the terminal or the smart household device may include a hardware structure and/or a software module, and implement the foregoing functions in a form of a hardware structure, a software module, or a hardware structure and a software module. Whether a function in the foregoing functions is performed in a form of a hardware structure, a software module, or a hardware structure and a software module depends on particular applications and design constraints of the technical solutions.

Figure 13:
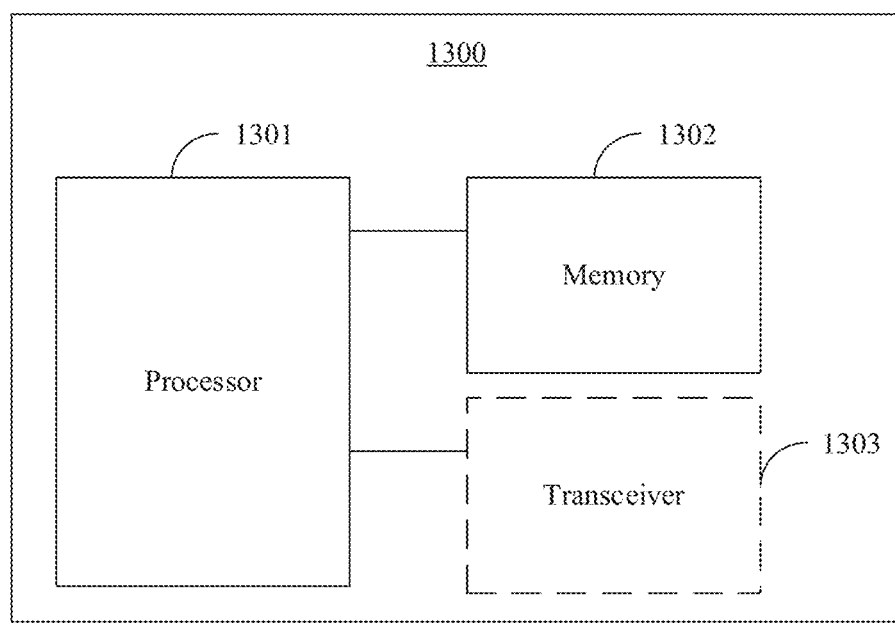
FIG. 13 is a schematic structural diagram of an electronic device according to an embodiment of this application.

As shown in FIG. 13, an embodiment of this application discloses an electronic device 1300. The electronic device 1300 may include one or more processors 1301 and memories 1302. In some embodiments, the foregoing components may be connected by using one or more communications buses. In addition, the foregoing components in this embodiment of this application may be connected in another manner.

The memory 1302 stores program instructions. The processor 1301 invokes the program instructions stored in the memory 1302, so that the electronic device 1300 performs the method for controlling a smart household device to connect to a network in the embodiments of this application. For example, if the electronic device 1300 is a terminal, the processor 1301 invokes the program instructions stored in the memory 1302, so that the electronic device performs the steps performed by the terminal in the method, shown in FIG. 7, for controlling a smart household device to connect to a network. For another example, if the electronic device 1300 is a smart household device, the processor 1301 invokes the program instructions stored in the memory 1302, so that the electronic device performs the steps performed by the smart household device in the method, shown in FIG. 7, for controlling a smart household device to connect to a network.

In the embodiments of this application, the processor 1301 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software module. The software module may be located in the memory 1302. The processor 1301 reads the program instructions in the memory 1302, and completes the steps of the foregoing methods in combination with hardware of the processor 1301.

In this embodiment of this application, the memory 1302 may be a nonvolatile memory such as a hard disk drive (hard disk drive, HDD) or a solid-state drive (solid-state drive, SSD), or may be a volatile memory (volatile memory) such as a random access memory (random-access memory, RAM). The memory may be alternatively any other medium that can be used to carry or store desired program code in a form of an instruction or a data structure and that can be accessed by a computer, but is not limited thereto. The memory in this embodiment of this application may be alternatively a circuit or any other apparatus that can implement a storage function, and is configured to store program instructions and/or data.

In some embodiments, the electronic device 1300 in this embodiment of this application further includes a transceiver 1303. For example, when the electronic device 1300 is a terminal, the transceiver 1303 may be configured to send a second Wi-Fi name and/or a second Wi-Fi password to a smart household device. For another example, when the electronic device 1300 is a smart household device, the transceiver 1303 may be configured to receive a second Wi-Fi name and/or a second Wi-Fi password that are or is sent by a terminal.

In this embodiment of this application, the transceiver 1303 may be a circuit, a bus, a communications interface, or any other apparatus that may be configured to perform signal interaction. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods for each particular application to implement the described functions.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes various media that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a terminal, wherein the method comprises:
   receiving a reset operation of a user;
   determining, in response to the reset operation, whether a smart household device is disconnected from a network;
   creating a WI-FI hotspot based on a first WI-FI name and a first WI-FI password when the smart household device is disconnected from the network;
   obtaining a second WI-FI name or a second WI-FI password for the WI-FI hotspot;
   sending the second WI-FI name or the second WI-FI password to the smart household device using the Wi-Fi hotspot to enable the smart household device to re-access the network using a wireless access point (AP) and using either the second WI-FI name or the second WI-FI password;
   receiving, from the smart household device, a response indicating receipt of the second WI-FI name or the second WI-FI password; and
   automatically disabling, in response to receiving the response, the WI-FI hotspot.

2. The method of claim 1, further comprising:
   identifying that a distance between the terminal and the smart household device does not fall beyond a preset range; and
   further creating, in response to identifying that the distance does not fall beyond the preset range, the WI-FI hotspot.

3. The method of claim 1, comprising:
   receiving a reset stopping operation of the user; and
   stopping, in response to the reset stopping operation, a process of connecting the smart household device to the network.

4. The method of claim 1, further comprising determining whether an operation of changing the first WI-FI name to the second WI-FI name and changing the first WI-FI password to the second WI-FI password by the user on an application is detected, wherein the application is either a system application or a smart household device control application.

5. The method of claim 1, wherein after sending the second WI-FI name or the second WI-FI password, the method further comprises automatically disabling the WI-FI hotspot after a preset duration.

6. The method of claim 1, further comprising determining whether an operation of changing the first WI-FI name to the second WI-FI name by the user on an application is detected, wherein the application is either a system application or a smart household device control application.

7. The method of claim 1, further comprising determining whether an operation of changing the first WI-FI password to the second WI-FI password by the user on an application is detected, wherein the application is either a system application or a smart household device control application.

8. A method implemented by a smart household device, wherein the method comprises:
   accessing a network using a first WI-FI name and a first WI-FI password through a wireless access point (AP);
   accessing, after being disconnected from the network, a WI-FI hotspot using the first WI-FI name and the first WI-FI password to establish a connection to a terminal;
   receiving, from the terminal and over the WI-FI hotspot, a second WI-FI name or a second WI-FI password;
   re-accessing the network using the wireless AP and using either the second WI-FI name or the second WI-FI password; and
   sending, to the terminal, a response indicating that the second WI-FI name or the second WI-FI password was received.

9. The method of claim 8, wherein after receiving the second WI-FI name or the second WI-FI password, the method further comprises disconnecting from the hotspot.

10. The method of claim 8, wherein the smart household device comprises a router.

11. The method of claim 8, wherein the smart household device establishes a connection with a smart household cloud server.

12. The method of claim 8, wherein the smart household device comprises a hardware structure.

13. The method of claim 8, wherein the smart household device is computer software.

14. A terminal comprising:
- a non-volatile memory configured to store program instructions; and
- one or more processors coupled to the memory, wherein the program instructions cause the one or more processors to be configured to:
  - receive a reset operation of a user;
  - determine, in response to the reset operation, whether a smart household device is disconnected from a network;
  - create a WI-FI hotspot using a first WI-FI name and a first WI-FI password when the smart household device is disconnected from the network;
  - obtain a second WI-FI name or a second WI-FI password;
  - send the second WI-FI name or the second WI-FI password to the smart household device using the WI-FI hotspot to enable the smart household device to re-access the network using a wireless access point (AP) and using either the second WI-FI name or the second WI-FI password;
  - receive, from the smart household device, a response indicating receipt of the second WI-FI name or the second WI-FI password; and
  - automatically disable, in response to receiving the response, the WI-FI hotspot.

15. The terminal of claim 14, wherein the program instructions further cause the one or more processors to be configured to:
- identify that a distance between the terminal and the smart household device does not fall beyond a preset range; and
- further create, in response to identifying that the distance does not fall beyond the preset range, the WI-FI hotspot.

16. The terminal of claim 14, wherein the program instructions further cause the one or more processors to be configured to:
- receive a reset stopping operation of the user; and
- stop, in response to the reset stopping operation, a process of connecting the smart household device to the network.

17. The terminal of claim 14, wherein the program instructions further cause the one or more processors to be configured to determine whether an operation of changing the first WI-FI name to the second WI-FI name and changing the first WI-FI password to the second WI-FI password by the user on an application is detected, and wherein the application is either a system application or a smart household device control application.

18. The terminal of claim 14, wherein after sending the second WI-FI name or the second WI-FI password, the program instructions further cause the one or more processors to be configured to automatically disable the WI-FI hotspot after a preset duration.

19. The terminal of claim 14, wherein the program instructions further cause the one or more processors to be configured to determine whether an operation of changing the first WI-FI name to the second WI-FI name by the user on an application is detected, and wherein the application is either a system application or a smart household device control application.

20. The terminal of claim 14, wherein the program instructions further cause the one or more processors to be configured to determine whether an operation of changing the first WI-FI password to the second WI-FI password by the user on an application is detected, and wherein the application is either a system application or a smart household device control application.

* * * * *